(12) United States Patent
Scordilis

(10) Patent No.: US 6,860,093 B2
(45) Date of Patent: Mar. 1, 2005

(54) MOWER

(76) Inventor: Frank P. Scordilis, 119 Brandermill Rd., Spartanburg, SC (US) 29301

(*) Notice: Subject to any disclaimer, the term of this patent is extended or adjusted under 35 U.S.C. 154(b) by 0 days.

(21) Appl. No.: 10/493,326
(22) PCT Filed: Sep. 8, 2003
(86) PCT No.: PCT/US03/28031
§ 371 (c)(1), (2), (4) Date: Apr. 21, 2004
(87) PCT Pub. No.: WO2004/021763
PCT Pub. Date: Mar. 18, 2004

(65) Prior Publication Data
US 2005/0000202 A1 Jan. 6, 2005

Related U.S. Application Data

(63) Continuation of application No. 10/237,568, filed on Sep. 9, 2002, now abandoned.

(51) Int. Cl.[7] .............................................. A01D 34/00
(52) U.S. Cl. ........................................................ 56/15.2
(58) Field of Search ............................... 56/10.3, 10.4, 56/10.6–10.9, 15.1–15.9, 14.7, 11.9, 16.7, 231–235; 414/687, 688, 694, 695.8, 722

(56) References Cited

U.S. PATENT DOCUMENTS

| | | |
|---|---|---|
| 2,838,901 A | 6/1958 | Davis |
| 3,115,739 A | 12/1963 | Thoen et al. ........................ 56/6 |
| 3,526,083 A | 9/1970 | Barry et al. |
| 3,599,403 A | 8/1971 | Gante ........................... 56/10.4 |
| 3,665,685 A | 5/1972 | Allard |
| 4,573,306 A | 3/1986 | Smith et al. .................. 56/10.4 |
| 4,697,405 A * | 10/1987 | DeWitt et al. ................ 56/10.4 |
| 4,949,534 A | 8/1990 | Evans |
| 5,210,997 A * | 5/1993 | Mountcastle, Jr. ........... 56/15.2 |
| 5,396,754 A | 3/1995 | Fraley |
| 5,425,224 A | 6/1995 | Downey et al. |
| 5,775,075 A * | 7/1998 | Dannar ....................... 56/15.2 |
| 6,301,863 B1 | 10/2001 | Liebrecht |

FOREIGN PATENT DOCUMENTS

| | | |
|---|---|---|
| DE | 1927793 | 12/1970 |
| DE | 198 26 347 | 12/1999 |
| EP | 1305993 | 2/2003 |
| GB | 1250950 | 9/1971 |
| GB | 2081563 | 2/1982 |

OTHER PUBLICATIONS 2 page literature showing "The POLECAT" by TK Industries no date.

* cited by examiner

Primary Examiner—Robert E Pezzuto
(74) Attorney, Agent, or Firm—Charles L. Schwab; Nexsen Pruet

(57) ABSTRACT

A dual cutter head, self contained mower (30, 200) is provided for cutting vegetation beneath and on opposite sides of guard rails or cable barriers, and on opposite sides of rows of small trees, hedges, walls or fences. The cutter heads (52, 53 and 252, 253) are staggered to cut overlapping swathes and are adjustably biased to permit the cutter heads to move laterally away from one another when an obstacle is encountered. The outer cutter head (53, 253) can be swung to an overhead position to avoid road signs, poles or the like. The mower can be front or rear mounted and can be reversed to cut at either side of the supporting vehicle. A spray system (323) applies herbicides or other liquids to the area being mowed.

37 Claims, 15 Drawing Sheets

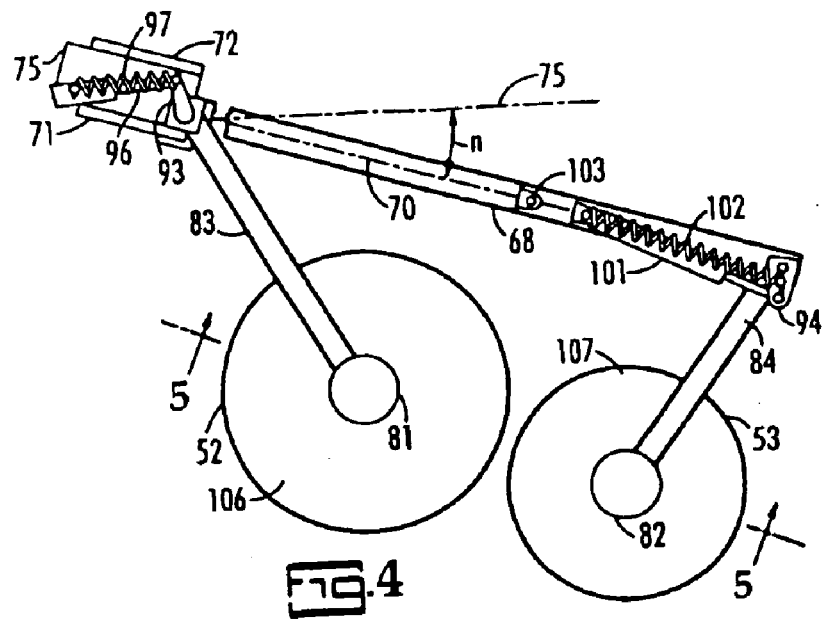
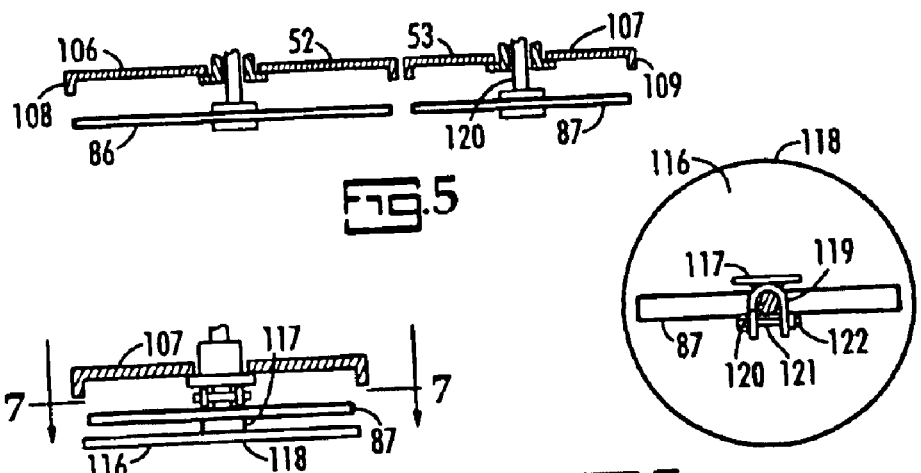
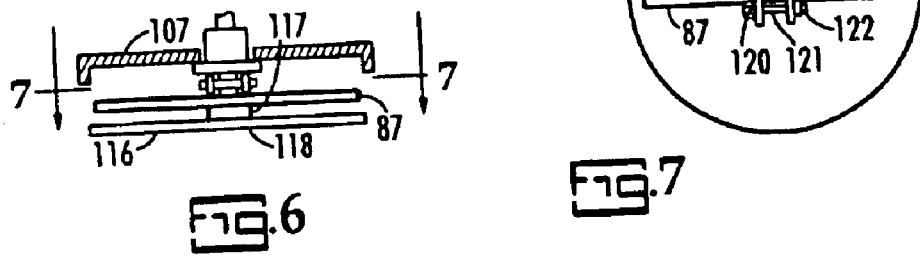
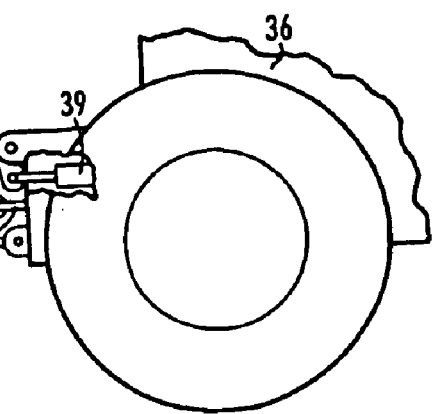

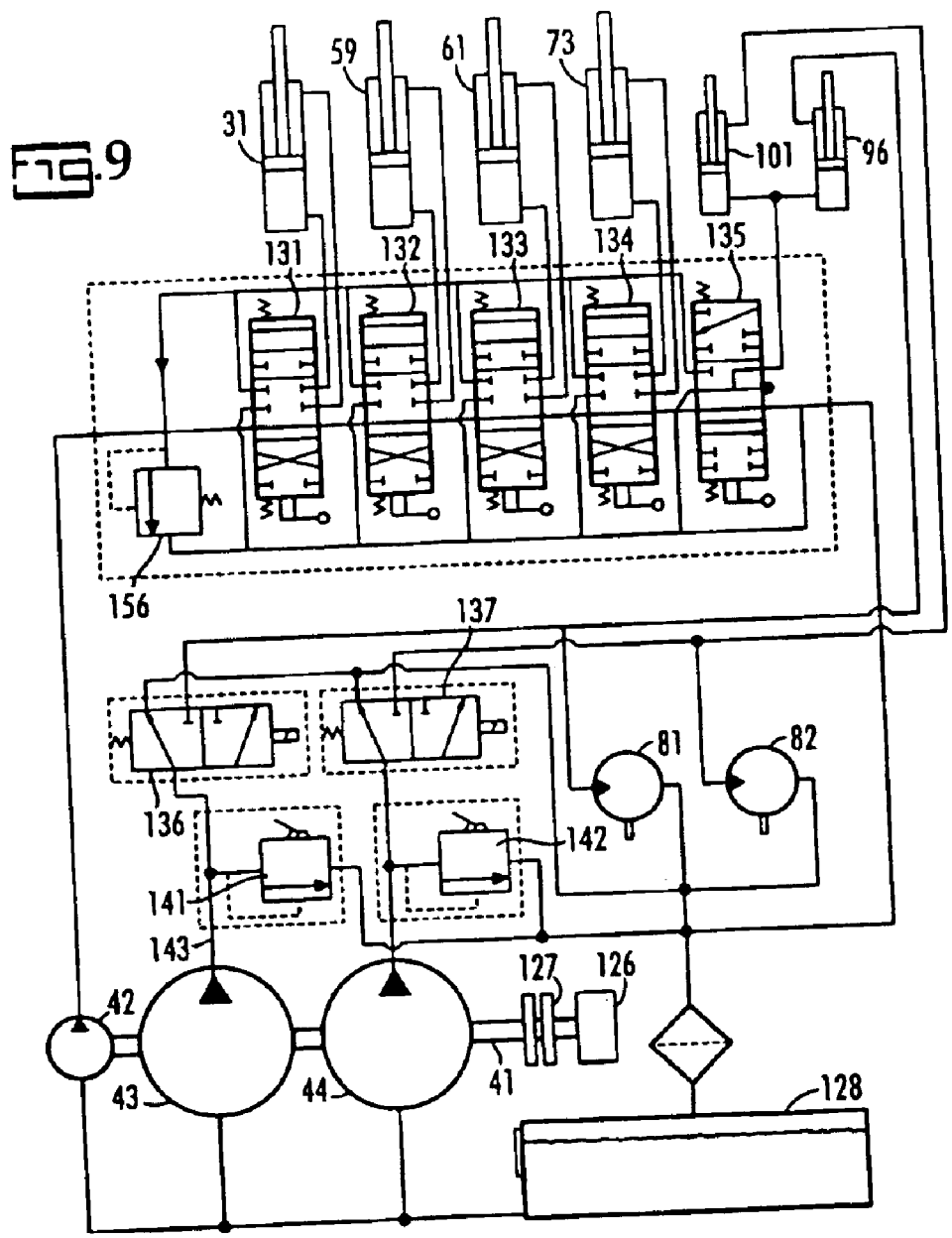
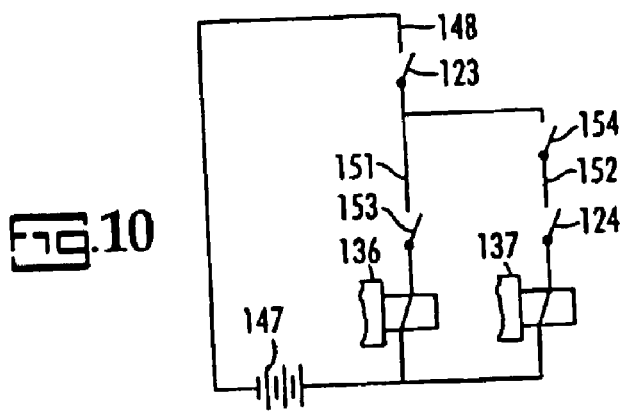

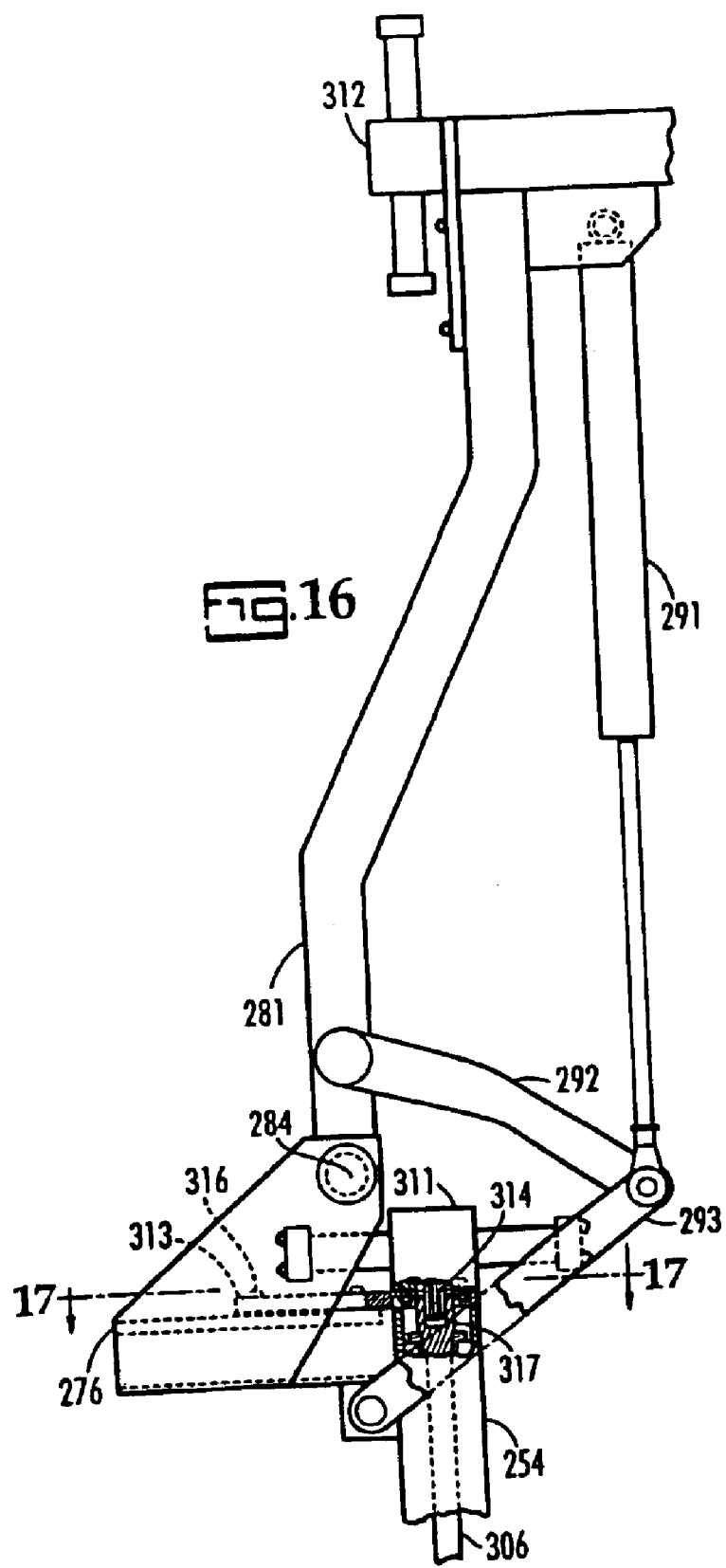

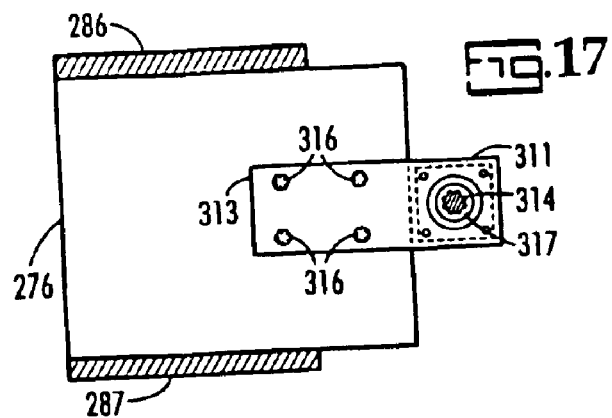
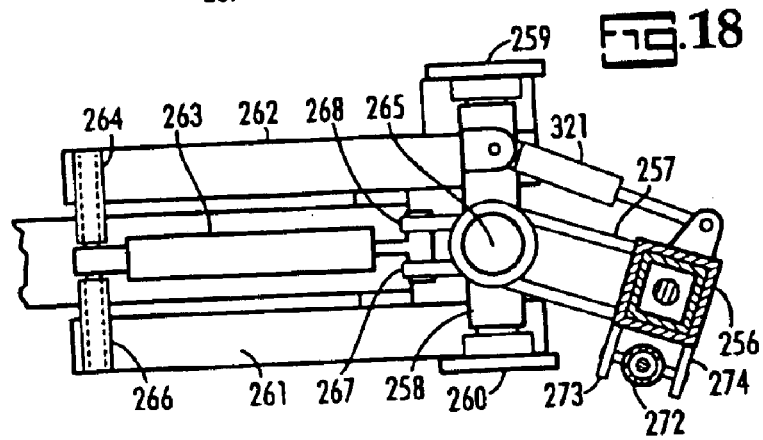
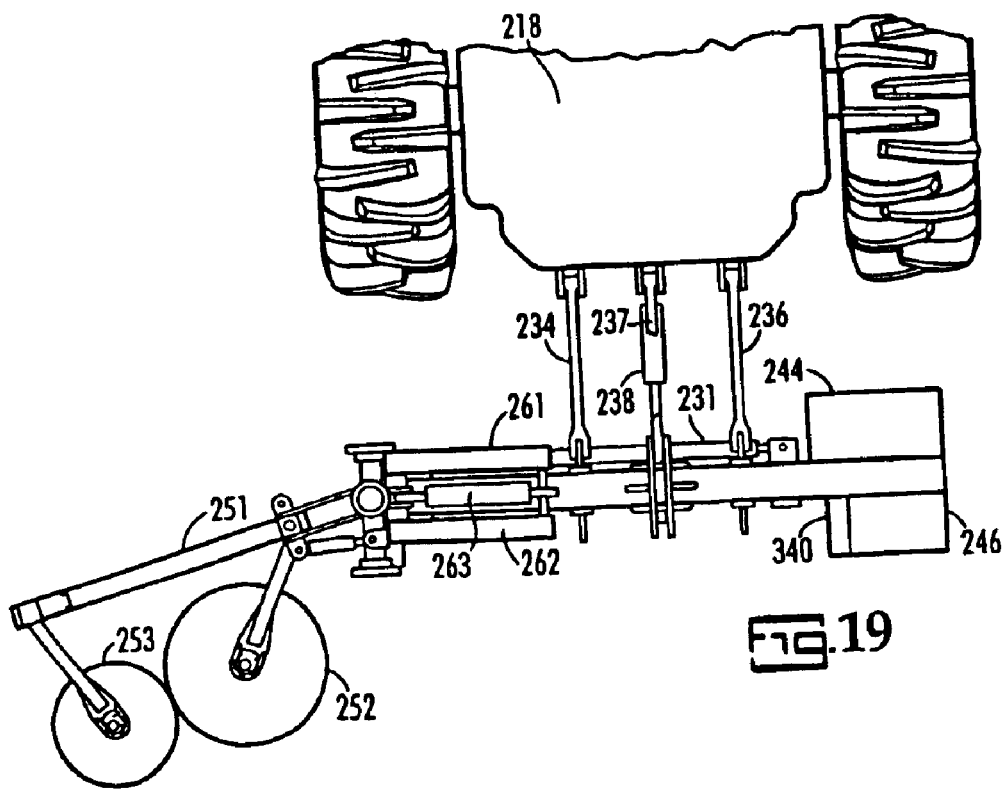

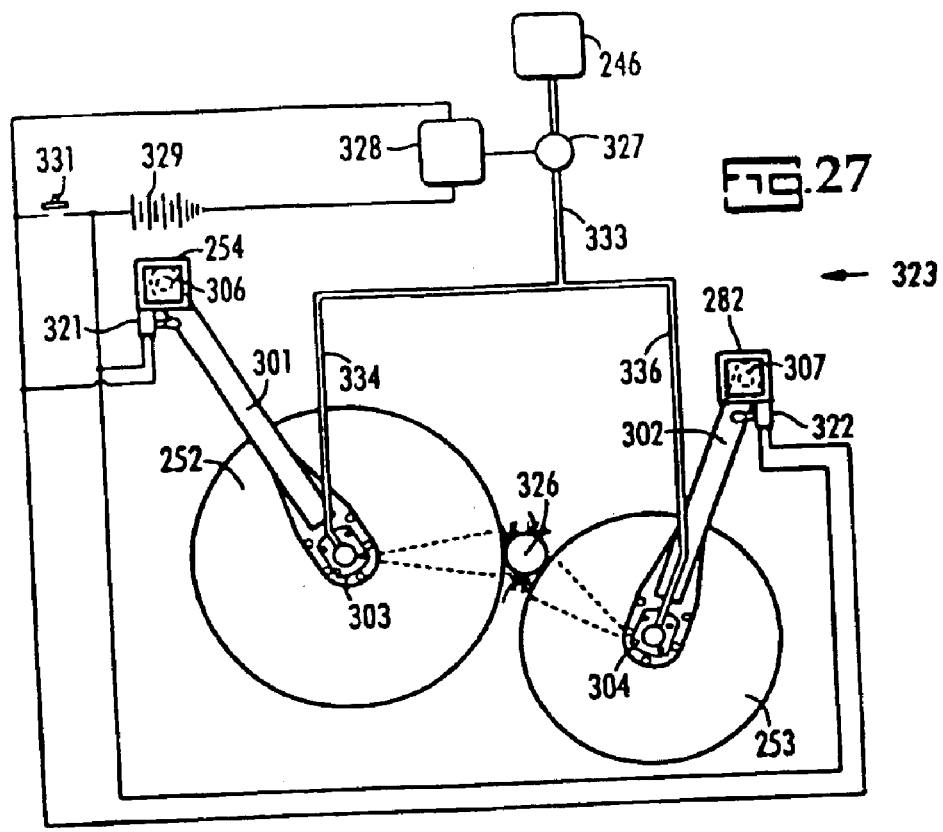
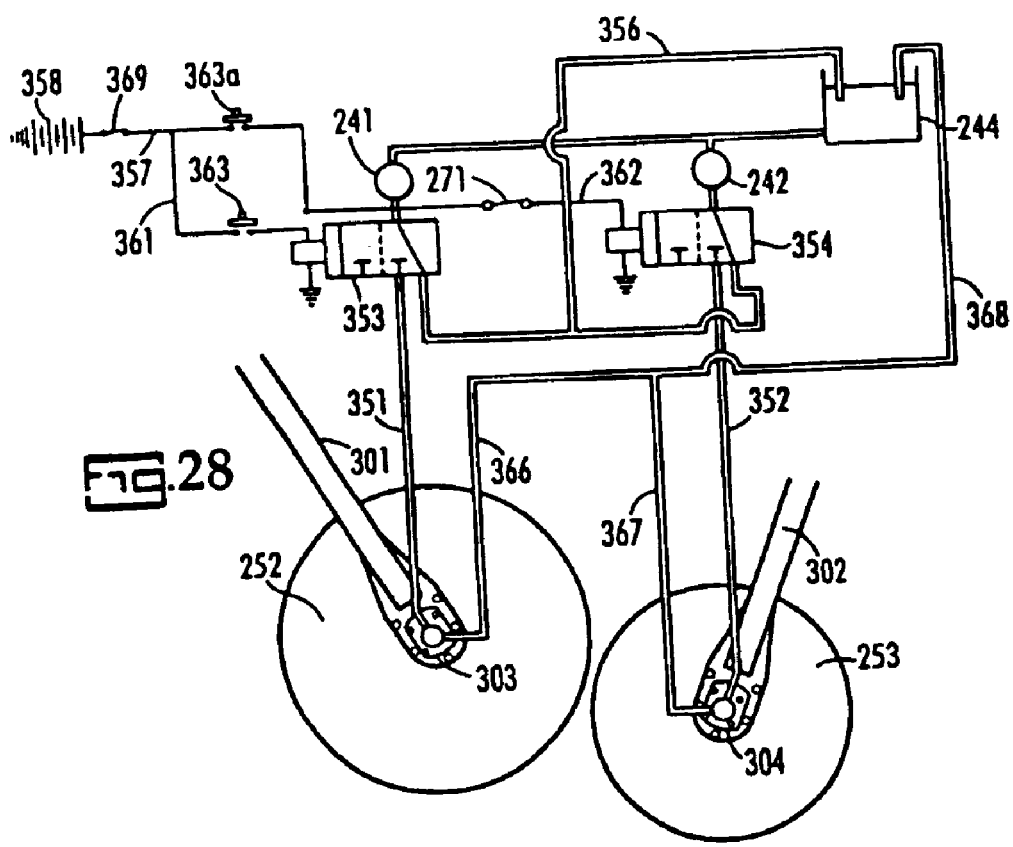

MOWER

This is a CON of Ser. No. 10/237,568 filed on Sep. 9, 2002 abandoned.

TECHNICAL FIELD

This invention relates to implements in the form of power driven mowers and more particularly to a double cutter head rotary mower for cutting vegetation and light brush under and on opposite sides of guardrails, media safety cables, fences and for mowing on opposite sides of rows of plants in nurseries, vineyards and tree farms.

BACKGROUND OF THE INVENTION

When conventional mowers are used to mow the highway areas where guardrails or media safety cables are present, a strip of uncut vegetation is left beneath the guardrail or safety cable. In an attempt to remedy this problem a double cutter head mower has been marketed which places cutter heads on opposite sides of the guardrail or cable barrier. However, the performance of this previously marketed mowing machine has not been found to be entirely satisfactory in its adjustability, adaptability and controls to provide safe and satisfactory performance and lacks adaptability to mow on opposite sides of rows of plants such as found in nurseries and the like.

OBJECTS AND BRIEF SUMMARY OF THE INVENTION

The dual cutter head mower of this invention may be constructed as an attachment for a wheeled support vehicle such as a tractor. The main support frame of the mower may be mounted on the front or rear of a tractor by a three point hitch and the mower may be driven by a power-take-off shaft of the tractor. The mower may also be mounted on either lateral side of the supporting tractor.

The main support frame of the guardrail mower includes a first subframe adapted for connection to a vehicle and a second subframe which is laterally adjustable relative to the first subframe, thus allowing the cutter heads to be adjusted laterally while stationary or while mowing. In a second embodiment of the invention the mower support frame can be reversed to permit mowing at the other side of the supporting vehicle.

The laterally inner and outer rotary cutter heads are supported on the lower ends of legs of an upright inverted U shaped frame having a laterally inward upright leg slidingly supported in a slide connector part of an intermediate frame. The slide connector part permits vertical adjustment of the mower heads and the pivot connection to the second subframe permits the U shaped frame to be pivoted between a mowing position and a transport position. The U shaped frame includes the before mentioned laterally inward upright leg and an inverted L shaped member which includes a laterally outward upright leg and a horizontally extending overhead beam having a free end pivotally connected to the upper end of the laterally inward leg so as to permit the laterally outer cutter head and its L shaped support member to be swung from a lowered mowing position to an overhead position to clear various obstacles such as road signs, light poles, trees, walls, fences, shrubs, hedges, vines and the like. When the outer cutter head is raised, power to the laterally outer cutter head is interrupted through operation of a position sensing control when the L shaped support frame is tilted more than about 22 degree. Power to the inner cutter head is continued to mow along side the obstacle being avoided. Manually actuated controls are also provided to selectively deliver or interrupt power to the cutter heads. The overhead beam of the L shaped support member extends laterally and rearwardly from the laterally inward leg at an approximate 15 to 20 degree trailing angle to a transverse vertical plane passing through the inner leg.

The pivotal connection between the second subframe and the intermediate frame on a fore and aft horizontal axis permits the U shaped frame and the cutter heads to be tilted to match a laterally upward or downward ground slope and to be pivoted to a transport position.

The cutting heads may be disposed in offset relation to one another in the direction of travel during a mowing operation and their cutting swaths may be adjusted to overlap several inches so that no vegetation is left uncut between the paths of the cutting heads. The cutting heads may also be adjusted to a suitable spacing to mow on opposite sides of fences, walls, cultivated grapes or other rows of plants.

The cutting heads are mounted, respectively, on the free ends of arms attached to vertical support shafts which in turn are pivotally mounted, respectively, on the vertical legs of the inverted U shaped member. Hydraulic actuators are connected to the upper ends of the two vertical support shafts and the hydraulic actuators may be actuated to pivot the cutter heads away from one another should this be necessary due to the nature of any obstacle in the mowing path or when mowing on opposite sides of a wall or row of plants. Adjustable springs or variable pressure pneumatic accumulators may be associated with the hydraulic actuators so that when an obstacle is encountered by the cutter head, the cutter head moves laterally; and after the obstacle is passed the associated spring or accumulator returns the cutter head to its previous position.

A freely rotatable rotary disc cover is provided on each cutter head to effect the lateral movement of the cutter head when an obstacle is encountered. The disc cover has a cylindrical outer surface which minimizes damage to guardrail posts, fence posts, trees, hedge rows or similar obstacles when they are engaged by the rotary disc cover.

Position sensitive controls are provided to interrupt power to the cutter heads when the inverted U shaped frame is moved to its transport position and to interrupt power to the laterally outer cutter head when the inverted L shaped member is pivoted a predetermined angle from its level mowing position.

In a second embodiment of the invention additional features are provided which permit the mower attachment to be reversed to mow at the opposite lateral side of the vehicle on which it is mounted. The support frame has hitch components at both its front and rear sides in the second embodiment to permit the mower to be attached to the front or rear of a tractor and to be reversed to cut at either lateral side of the tractor. In the second embodiment, the intermediate frame includes a coupler which is pivotally connected to the slide connector on an axis parallel to the laterally inward leg of the U shaped frame and which is pivotally connected to the second subframe on the fore and aft extending horizontal axis. A hydraulic actuator is interconnected between the coupler and the slide connector and is operable to pivot the U shaped frame about its pivot connection with the coupler to reposition the U-shaped frame when the mower is mounted on the other lateral side of the supporting vehicle.

The second embodiment also provides multi-position or adjustable couplings between the tops of the vertical support shafts and the hydraulic actuators. This feature allows the cutter heads to be repositioned when the mower attachment is reversed to the opposite side of the supporting vehicle.

Also in the second embodiment of the invention liquid spray apparatus is provided to deliver a liquid spray to the ground area where the two mower heads confront one another. Automatic spray control apparatus may be provided to spray the before mentioned ground area when either mower head is moved laterally, as by a guard rail post, and the spray control apparatus may also permit manual control of spray delivery to the ground area. The spray control apparatus is particularly useful in applying herbicide to uncut areas next to guard rail posts and fences and it may be operated to apply fertilizer or insecticide to rows of small trees, shrubs, berries, grapes or the like.

A primary object of this invention is to provide a mower which efficiently mows vegetation beneath and on opposite sides of barrier structures, such as post supported fences, guardrails and guard cables and which may be used to mow on opposite sides of walls, fences, hedges, small trees or rows of other plants. It is a further object of this invention to provide a guardrail mower which allows the cutter heads to be repositioned to efficiently mow different surface contours and to be adjusted to a transport position. It is also an object of this invention to provide a mower which operates at the front or rear of a support vehicle and which can be adjusted to operate at either lateral side of a support vehicle. It is a further object of the invention to provide apparatus which automatically sprays a liquid, such as a herbicide, when a cutter head is deflected by an obstacle or which can be selectively operated to apply a herbicide, fertilizer or insecticide when the mower is used to mow on opposite sides of a row of shrubs, bushes, small trees or the like.

BRIEF DESCRIPTION OF THE DRAWINGS

The invention is illustrated in the accompanying drawings, in which:

FIG. 4 is a partial top view of the mower of FIG. 1 showing the cutter heads and their support components;

FIG. 5 is a section taken on the line 5—5 in FIG. 4;

FIG. 6 is view similar to FIG. 5 showing a guard disc attached to a cutter head;

FIG. 7 is a section taken along the line 7—7 in FIG. 6;

FIG. 8 is a partial side view showing a connection between the mower of FIG. 1 and a tractor, FIG. 9 is a schematic showing a hydraulic control system for the mower of FIG. 1;

FIG. 10 is schematic showing an electric control circuit for two solenoid valves controlling power to the two cutter heads of mower of FIG. 1;

FIG. 16 is a partial view of the second embodiment mower showing a spline connection between a fluid power unit and the upper end of a vertical cutter head support shaft;

FIG. 17 is a view taken on the line 17—17 in FIG. 16;

FIG. 18 is a section taken on line 18—18 in FIG. 13;

FIG. 19 is a top view of the second embodiment mower showing a reversed attachment to the rear of the tractor with the cutting heads and their support frame adjusted for mowing at the left side of the tractor;

FIG. 27 is a schematic showing the spray delivery apparatus and controls;

FIG. 28 is a schematic showing a control for the drive motors for the two cutter heads of the second embodiment mower.

DETAILED DESCRIPTION OF THE INVENTION

Figure 1:
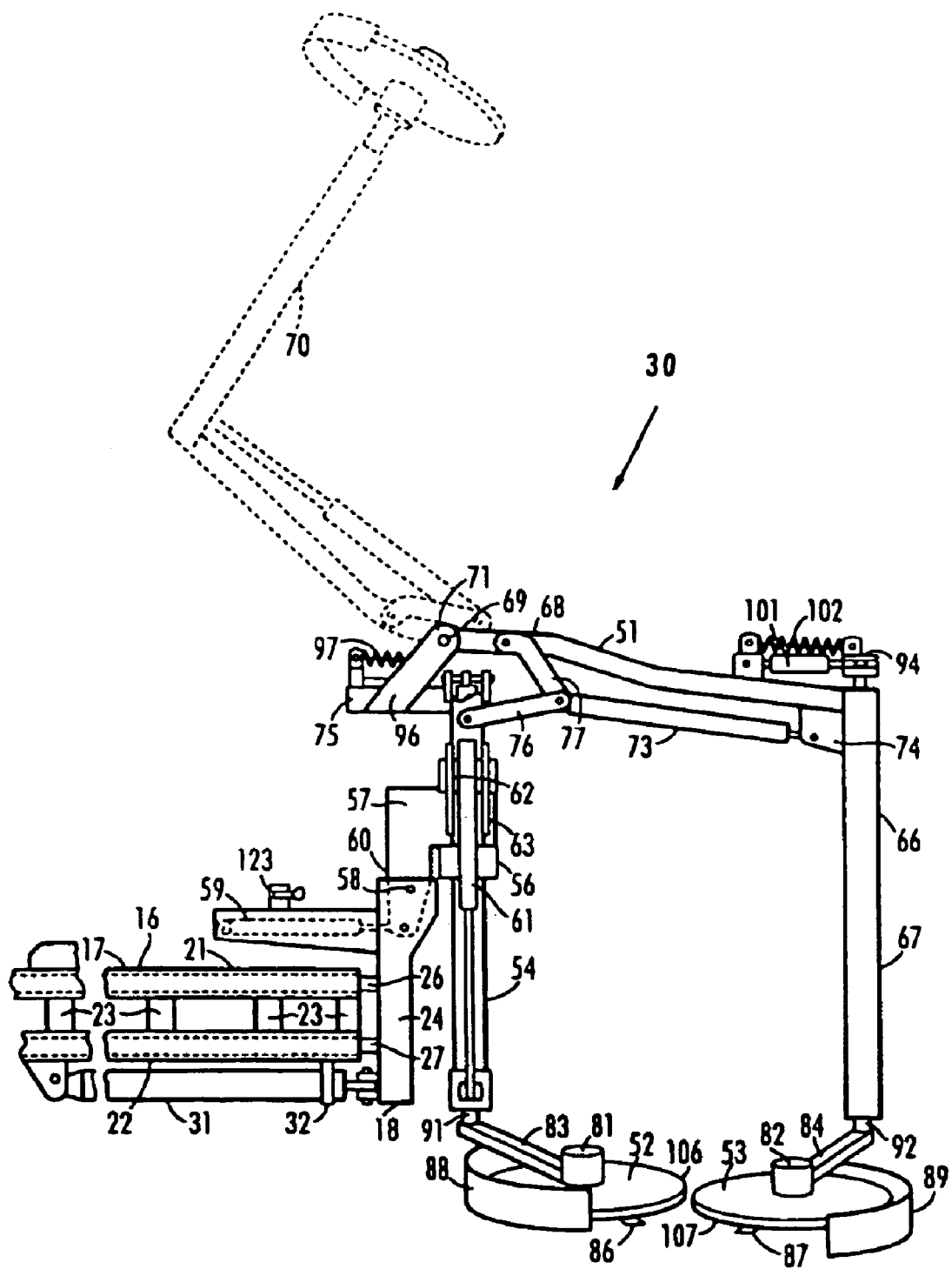
FIG. 1 is a rear view of one embodiment of a guardrail mower in a mowing position with broken lines showing a section of the mower raised to avoid an obstacle.

FIG. 1 is a rear view of a first embodiment of a dual cutter head mower 30 with some components removed and some parts broken away for illustration purposes. A mower support structure or mainframe 16 includes a first subframe 17 and a second subframe 18. The first subframe 17 includes a pair of guide members in a form of parallel square section hollow tubes 21, 22 to which cross braces 23 are welded. The second subframe 18 includes a pair of parallel guide members 26, 27 having a sliding fit in the hollow tubes 21, 22 of the first subframe 17 and having a post 24 to which the slide members 26, 27 are rigidly secured as by welding. A double acting linear actuator in the form of a double acting hydraulic ram 31 is interconnected between said subframes 17, 18 and is operable to adjust the lateral position of the second subframe 18 as much as 40 inches. A U shaped support strap 32 welded to the tube 22 supports the cylinder component of the hydraulic ram 31.

As shown in FIG. 8, the first subframe 17 is adapted for a support connection to a tractor 36 by a three point hitch including a pair laterally spaced lower links 37 and an upper link 38. The tractor 36 is shown equipped with a hydraulic ram 39 which is connected to the upper links 38 however, the lift ram could be connected through bellcranks and linkage to the lower links 37. The tractor 36 has a power-take-off shaft 41 which is drivingly connected to three hydraulic pumps 42, 43, 44 through a speed changer 46. The hydraulic pumps 42, 43, 44, a hydraulic tank, not shown, and valves for controlling flow of power fluid to various hydraulic power actuators are supported on the first subframe 17.

Figure 2:
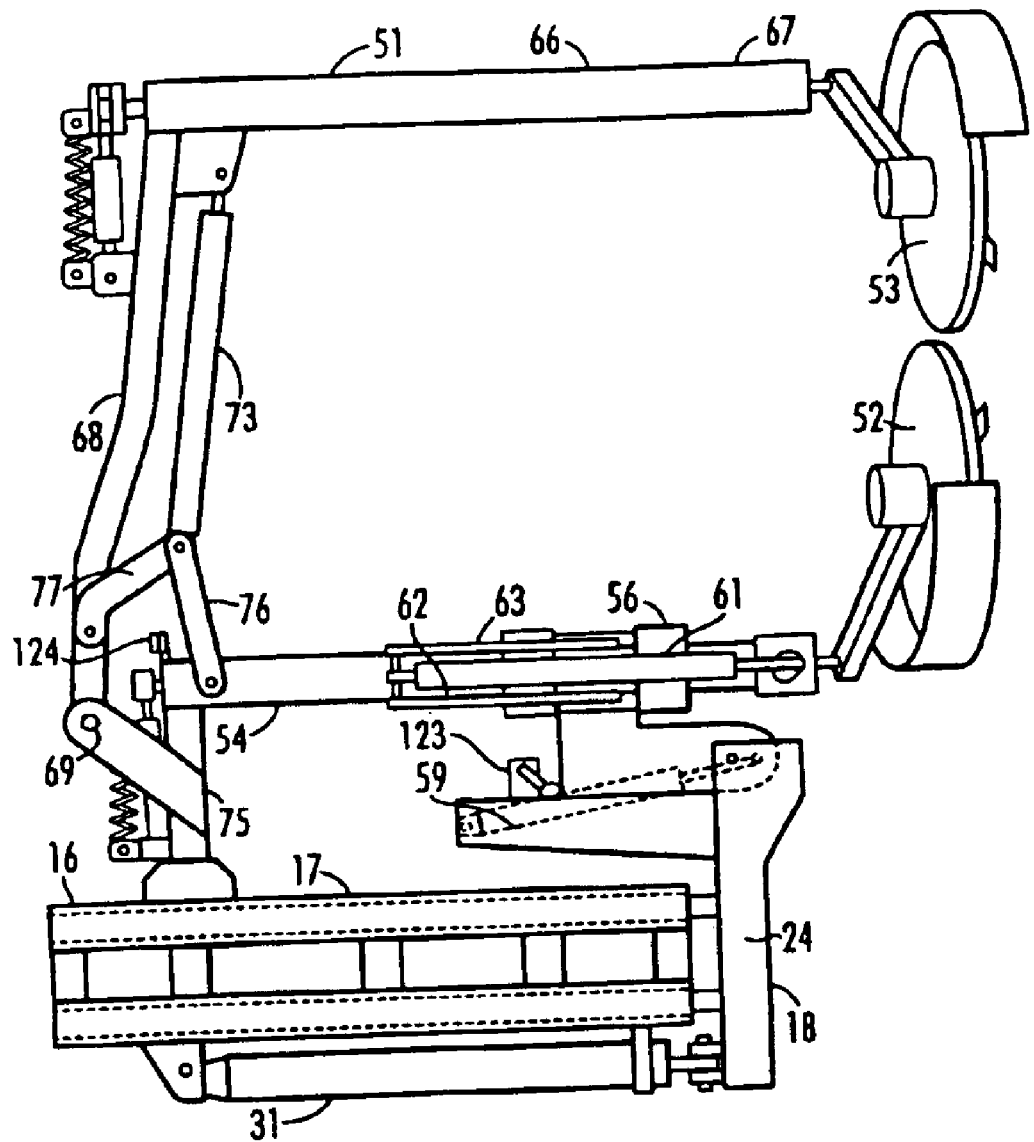
FIG. 2 is a rear view showing the mower of FIG. 1 folded to a transport position.

An inverted U shaped frame 51 for supporting a pair of rotary cutter heads 52, 53 includes a first inward upright leg 54 slidingly supported by a slide block 56 of a connector 57 by which the U shaped frame 51 is pivotally connected to the second subframe 18 on a fore and aft horizontal axis 58 extending in the direction of travel during a mowing operation. A hydraulic power actuator in the form of a double acting ram 59 has one end connected to the second subframe 18 and its other end connected to a lever arm 60 of the connector 57 at a point spaced below the axis 58. Extension of the hydraulic ram 59 swings the inverted U shaped frame 51 about the pivot axis 58 to a transport position as illustrated in FIG. 2. By operating the ram 59 the U shaped frame 51 can be tilted upwardly or downwardly about 22 degrees to cut areas sloping laterally upwardly or downwardly.

A double acting linear power actuator in the form of a double acting ram 61 has its rod end connected to the lower end of the first inward upright leg 54 and its cylinder end connected to a pair of mounting brackets 62, 63 rigidly secured to the connector 57. Extension and contraction of the ram 61 permits the mower operator to adjust the elevation of the cutter heads 52, 53 as much as 24 inches to conform to the contour of the land being mowed and also to adjust the inverted U shaped frame 51 to a properly positioned transport position, as shown in FIG. 2.

The inverted U shaped frame 51 includes an inverted L shaped member 66 having an outward upright second leg 67 and a horizontally extending beam 68 which has one end welded to the upper end of the second leg 67 and its free end pivotally connected by a pin 69 to side walls 71, 72 of a bracket 75 rigidly secured as by welding to the upper end of the first leg 54. As shown in FIG. 4, the beam 68 lies in a vertical plane 70 extending laterally from the inward upright leg 54 at an angle n of 17 degrees from a transversely extending vertical plane 75 through the first upright leg 54. As shown in FIG. 1, a linear power actuator in the form of double acting hydraulic ram 73 is interconnected between the inverted L shaped member 66 and the first leg 54. The rod end of the ram 73 is pivotally connected to a corner bracket 74 on the L shaped member 66 and the cylinder end of the ram 73 is pivotally connected to the interconnected ends of links 76, 77 at their pivot connection to each other. The other ends of the links 76, 77 are pivotally connected, respectively, to the inward leg 54 and the beam 68. Upon expansion of the ram 73 the inverted L shaped member 66 can be swung vertically 150 degrees about the horizontal axis of the connector pin 69 to an overhead position, as shown by broken lines in FIG. 1. Thus the mower operator can raise the laterally outer cutter head 53 and its L shaped supporting member 66 to avoid road signs, utility poles, trees, vines and other obstacles while mowing with the other cutter head 52.

The cutter heads 52, 53 include power units in the form of hydraulic motors 81, 82 mounted on support arms 83, 84, respectively, and the motors 81, 82 are drivingly connected to cutting blades 86, 87, respectively. As shown only in FIG. 1, curved deflectors 88, 89 are secured to the support arms 83, 84, respectively. The support arms 83, 84 are nonrotatably secured to the lower ends of shafts 91, 92, respectively, which are rotatably supported by and extend through the hollow interior of the legs 54, 67.

Referring also to FIG. 4, lever arms 93, 94 are nonrotatably secured to the upper ends of the shafts 91, 92, respectively. A power actuator in the form of a single acting hydraulic ram 96 has its cylinder end pivotally connected to the bracket 75 and its rod end pivotally connected to the lever arm 93. A tension spring 97 is interconnected between the bracket 75 and the lever arm 93 biasing the ram 96 to its contracted condition as illustrated in FIG. 4. In a similar manner a power actuator in the form of a single acting hydraulic ram 101 has its cylinder end pivotally connected to the beam 68 and its rod end pivotally connected to the lever arm 94. A tension spring 102 is interconnected between the beam 68 and the lever arm 94 secured to the upper end of the shaft 92. The biasing force on the lever arm 94 and the cutter head support arm 84 can be adjusted by connecting the end of the spring 102 to an alternate bracket 103 welded to the beam 68. Suitable stops, not shown, may be provided on the legs 54, 67 to limit the swinging movement of the cutter head support arms 83, 84 toward one another. In the illustrated embodiment of the invention the single acting rams 96, 101 are fully retracted to a "bottomed out" position and act as stops limiting the pivoting of the shafts 54, 67 and their support arms 83, 84 in directions moving the cutter heads toward one another.

Figure 3:
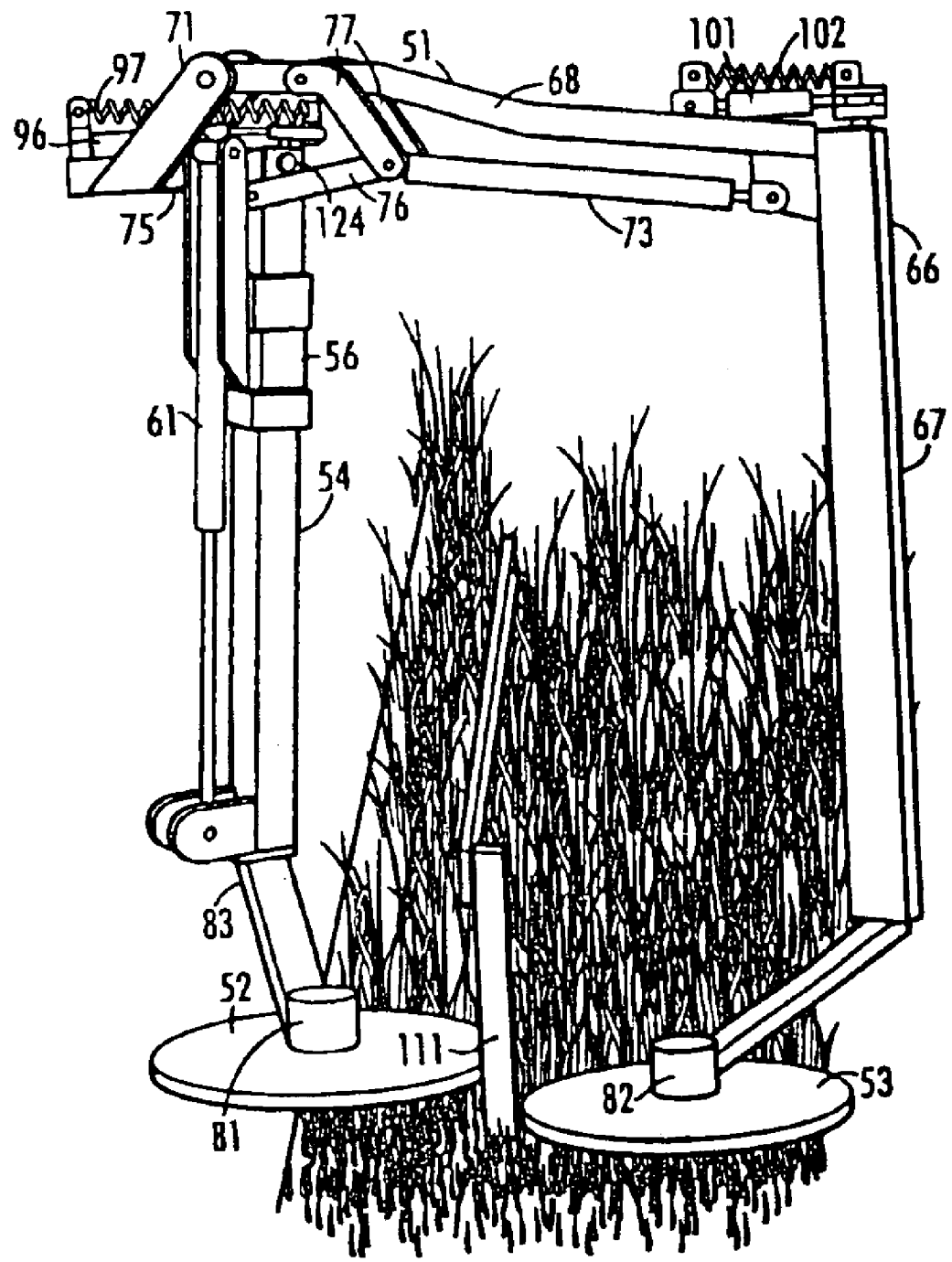
FIG. 3 is a perspective view of the mower of FIG. 1 showing the cutter heads passing around a guardrail post.
Figure 11:
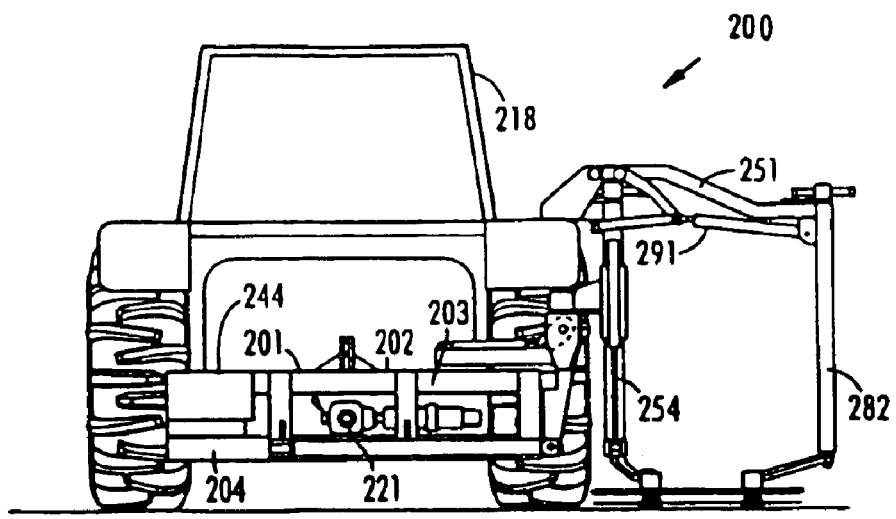
FIG. 11 is a rear view of a second embodiment of the mower mounted on the rear of a tractor.

As shown in FIG. 5, the cutter heads 52, 53 have annular covers or disks 106, 107, respectively, which are free to rotate, which is advantageous when an obstacle is encountered such as is illustrated in FIG. 3. The annular covers 106, 107 include rims 108, 109 presenting radially outward facing cylindrical surfaces which engage obstacles, such as the post 111 shown in FIG. 3, without structural damage to the obstacle. When the guardrail post 111 in FIG. 3 is encountered by one or both of the cutter heads 52, 53, the associated rotating cover 106 and/or 107 will rollingly engage the post and the associated support arm or arms 83, 84 will swing away from the post 111 against the biasing of the associated springs 97, 102. The mower operates in a like manner when used to mow on opposite sides to a row of small trees in a nursery.

Referring to FIGS. 6 and 7 an annular guard 116 is releasably secured to a shaft 120 of the cutter head 53 when the mower is not in use. The guard 116 includes an upstanding bracket 117 which is welded at its bottom end to a guard disc 118 and is welded at its upper end to a U shaped element 119 secured to the shaft 120 by a bolt 121 and a nut 122. A similar guard may be placed on the cutter head 52.

When the inverted U shaped frame 51 is moved to its transport position illustrated in FIG. 2, a position sensitive switch 123 is engaged by the connector 57 which interrupts power to the hydraulic motors 81, 82 of the cutter heads 52, 53. When the inverted L shaped member 66 is pivoted laterally outward 22 degrees, a position sensitive switch 124 mounted on the leg 54, as shown in FIGS. 2 and 3, is engaged which interrupts power to the hydraulic motor 82 of the cutter head 53.

Referring to FIG. 9, which schematically illustrates the hydraulic control system for the hydraulic rams 31, 59, 61, 73, 96, and 101, the pumps 42, 43, 44 are driven by a source of power 126 through a drive train, such as the power take off shaft 41, which may include a clutch 127. The pumps 42, 43, 44 draw hydraulic fluid from a reservoir 128 to which they are connected in parallel. The pump 42 delivers pressurized hydraulic fluid to manually operated values 131, 132, 133, 134 and 135. The valves 131, 132, 133 and 134 control the hydraulic rams 31, 59, 61, 73 and the valve 135 controls hydraulic rams 96 and 101.

The pump 43 delivers pressure fluid to the cutter head motor 81 via solenoid control valve 136 and the pump 44 delivers pressure fluid to the cutter-head motor 82 via a solenoid valve 137. Relief valves 141, 142 are connected to the output lines 143, 144 of the pumps 43, 44 to provide pressure relief should the cutter head blades encounter an obstacle preventing rotation. When pressure fluid is delivered by the pumps 43, 44 to the cutter head motors 81, 82, pressure fluid is also delivered to the rod side of the single acting hydraulic rams 96, 101. When either of the cutter head motor 81 or 82 is operating, the associated single acting hydraulic ram 96 or 101 is biased by fluid pressure in it's the rod side toward a bottomed out position which is the desired position during normal moving conditions. When the output of either pump 43 or pump 44 is connected to the reservoir 128, the rod end of the associated ram 96 or 101 is also connected to the reservoir 128 through apparatus now shown.

Referring to FIG. 10, the solenoid valves 136, 137 controlling pressure fluid flow to the cutter head motors 81, 82 are provided with an electric control which includes a source of electric power, such as the battery 147, delivering power to the solenoid valves 136, 137 through a main lead 148 in which a position limit switch 123, also shown in FIG. 2, is placed to stop all power to the cutter head motors 81, 82 when the inverted U shaped frame 51 is pivoted to its transport position. Parallel branch leads 151, 152 supply power, respectively, to the solenoid valves 136, 137. Assuming the inverted U shaped frame 51 is in its normal mowing position, the cutter head motors 81, 82 can be operated by closing their individual control switches 153, 154, respectively. When the L shaped member 66 is swung 22 degrees, the position sensitive switch 124 opens and rotation of the blade 87 of the laterally outer cutter head 53 ceases. When the L shaped member is pivoted to a position below the before mentioned 22 degrees the switch 124 closes.

The guardrail mower efficiently removes vegetation on both sides and beneath post supported guardrails, cables and fences and is adapted to mow on opposite sides of small trees, hedges, cultivated grapes and the like. The cutter heads 52, 53 can be raised vertically as much as 24 inches from their lowered position. The cutter heads 52, 53 cut swathes overlapping as much as 14 centimeters and can be swung away from one another by moving the flow control element of the control valve 135 upwardly, as viewed in FIG. 9. The pressure of fluid delivered by the pump 42 to the cylinder ends of the rams 96, 101, as established by a relief valve 156, is sufficient to overcome the force of the pressure fluid acting on the rod end of the rams 96, 101. The free wheeling cover discs 106, 107 will engage posts and similar obstacles and rotate as the associated cutter head passes by them thus ensuring the mowing of virtually all of the vegetation beneath the associated guard rail or fence. The rotating cover discs 106, 107 have cylindrical edges 108, 109 which prevent structural damage to the posts. The cylindrical edges 108, 109 are in closely adjacent juxtaposed relation to one another but preferably not touching, thus avoiding contact wear of the edges 108, 109. The inverted L shaped member 66 can be tilted 22 degrees about a horizontal axis, extending substantially in the direction of travel during mowing, without interrupting power to the cutter head 53. The arch clearance of the U shaped frame, in its lowered position, is 66 inches; however, the outer cutter head and its L shaped frame 67 can be swung as much as 150 degrees to an overhead position to avoid road signs, light posts, trees and other obstacles while the other cutter head continues operation. The inverted U shaped frame 51 can be shifted laterally as much as 40 inches thus permitting the operator to follow desired irregular paths dictated by the terrain and obstacles, which paths would be difficult or impossible to follow by steering the supporting tractor. The laterally outer cutter head preferably has a smaller diameter than the laterally inner cutter head.

The mower 200 of the second embodiment of the invention illustrated in FIGS. 11–29 has a support frame 201 which includes a first subframe 202 having upper and lower parallel guide members in the form of square section tubes 203, 204 to which six cross braces are welded. Upper and lower three point hitch connections or components 211, 212, 213, 214, 216, 217 are welded to the first subframe 202 which permit a three point hitch equipped tractor 218 to be hitched to either of the front and rear sides of the support frame 201. A gear box 221 mounted on support frame has a fore and aft extending input shaft 222 with opposite ends extending from its front and rear sides, respectively.

A second subframe 226 includes a pair of parallel guide members 227, 228 having a sliding fit in the hollow tubes 203, 204 of the first subframe 202 and having a vertically extending post 229 welded to their ends extending from the tubs 203, 204. A double acting linear actuator in the form of a double acting hydraulic ram 231 has its cylinder component connected to the first subframe and has its rod component pivotally connected to the post 226. The hydraulic ram 231 is operable to adjust the second subframe laterally approximately one meter.

Figure 12:
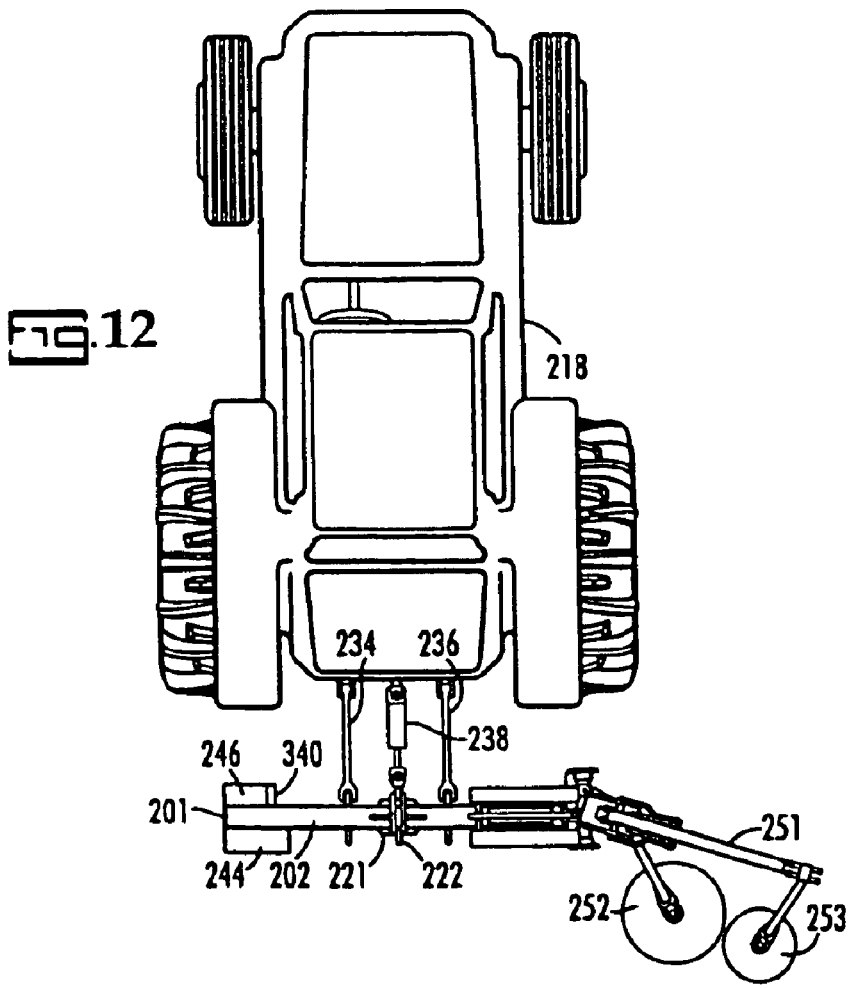
FIG. 12 is a top view of the mower and tractor of FIG. 11.

As shown in FIG. 12 the mower is attached to the tractor 218 by three point hitch links 234, 236, 237 and the tractor's power take off shaft 238 is connected to the input shaft 222 of the gear box 222 which in turn is drivingly connected to in-line hydraulic pumps 241, 242, 243 mounted on the first subframe 202 which draws fluid from a reservoir 244 also mounted on the first subframe 202. A reservoir 246 for chemical spray liquid is also mounted on the first subframe 202.

Figure 13:
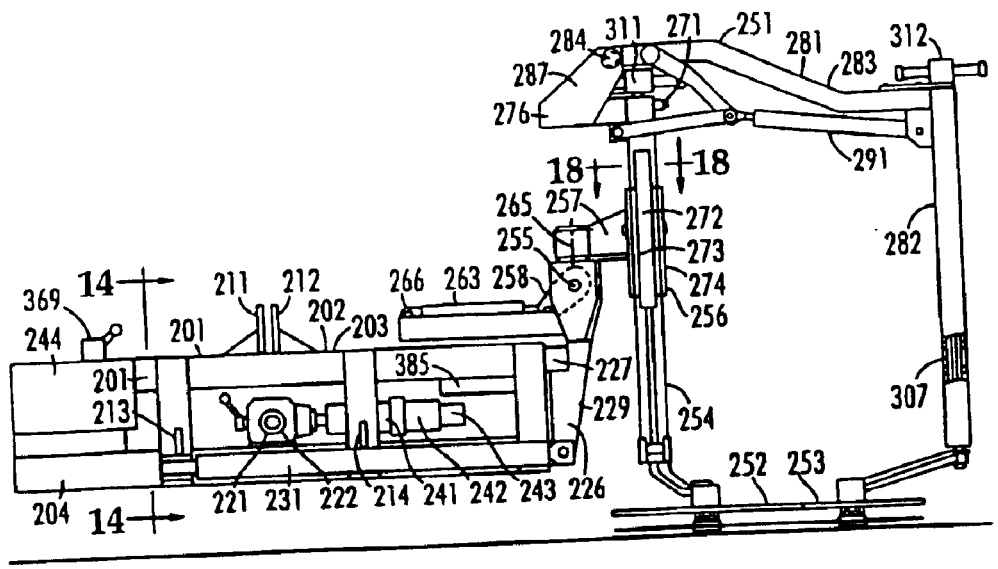
FIG. 13 is a rear view of the mower shown in FIGS. 11 and 12.
Figure 14:
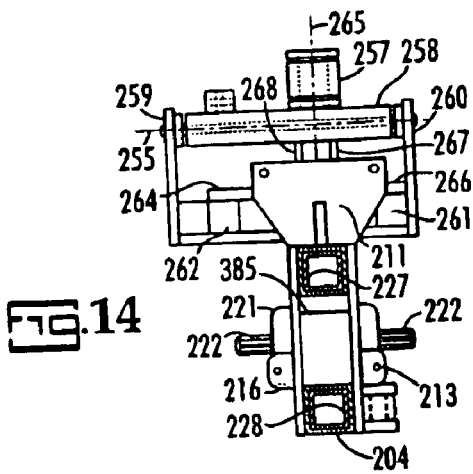
FIG. 14 is a section taken on the line 14—14 in FIG. 13.
Figure 15:
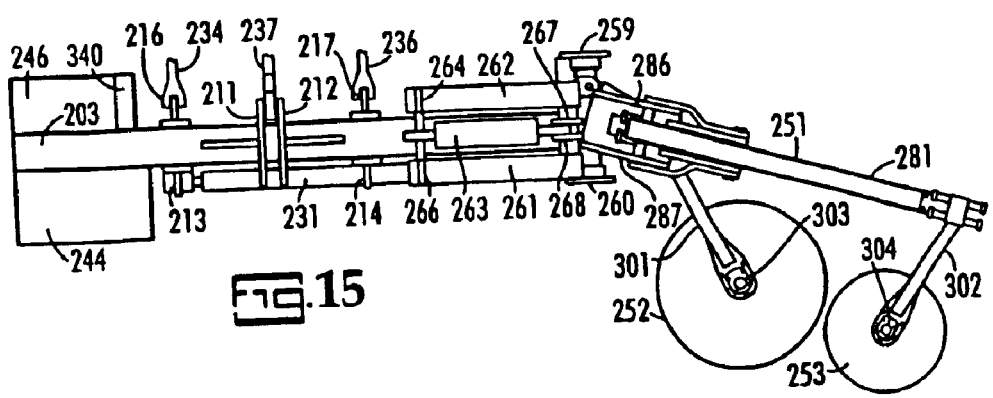
FIG. 15 is a top view of the mower shown in FIG. 13.

Referring to FIGS. 13, 14 and 15, an inverted U shaped frame 251 for supporting a pair of rotary cutter heads 252, 253 includes a first inward upright leg 254 slidingly supported by a slide block 256 of a connector 257. The connector 257 includes a coupler 258 which is pivotally connected to the slide block 256 on an axis parallel to the inward leg 254. The coupler 258 in turn is pivotally connected to brackets 259, 260 of a U shaped upper end of the post 229 of the second subframe 226 on a fore and aft extending axis 255 transverse to the axis 265 of the pivot connection between the slide block 256 and the coupler 258. The post 229 includes a pair of parallel cantilever beams 261, 262 extending laterally inwardly above the support frame 201. A double acting hydraulic ram 263 has its cylinder component pivotally connected to a pair of aligned bushings 264, 266 welded to the free ends of the cantilever beams 261, 262 and its rod end pivotally connected to parallel downwardly extending lever arms 267, 268 of the coupler 258. Extension of the hydraulic ram 263 pivots the U shaped frame 251 about the axis 255 from its normal cutting position shown in FIGS. 11 and 13 to a transport position above the support frame 201 in which position a switch 369 mounted on the first subframe 202 is engaged which in turn interrupts power to both cutter heads 252, 253. The inverted U shaped frame 251 may be tilted upward about 22 degrees before a position sensitive switch 271, shown in FIGS. 13 and 24, interrupts power to the outer cutter head 253. Full contraction of the hydraulic ram 263 tilts the U shaped frame and the cutter heads in a downward direction about 10 degrees to facilitate cutting on slopes slanting laterally downwardly from the tractor.

As shown in FIG. 13, a double acting linear power actuator in the form of a double acting ram 272 has its rod end connected to the lower end of the inward upright leg 254 and its cylinder end is pivotally mounted on a pair of brackets 273, 274 welded to the slide block 256. The ram 272 is operable to raise and lower the U shaped frame 251 and its cutter heads 252, 253. When the ram 263 is extended to pivot the U shaped frame 90 degrees to a transport position, the ram 272 is contracted so that a bracket 276 on the upper end of the leg 254 will rest on top of the support frame 201 and open the switch 369.

The inverted U shaped frame 251 includes an inverted L shaped member 281 having an outward upright leg 282 and a horizontally extending beam 283 welded at one end to the outward upright leg 282 and pivotally connected on a horizontal axis 284 at its other end to a pair of upstanding plates 286, 287 on the bracket 276.

The inverted L shaped member 251 can be pivoted upwardly about the pivot axis 284 to a raised position such as shown in FIG. 16 by extension of a double acting linear hydraulic ram 291, which has its cylinder end pivotally connected to a corner bracket at the top of the outward leg 282 and its rod end pivotally connected to the interconnected ends of links 292, 293. The other ends of the links 292, 293 are pivotally connected, respectively, to the beam 283 and the inward leg 254.

Figure 25:
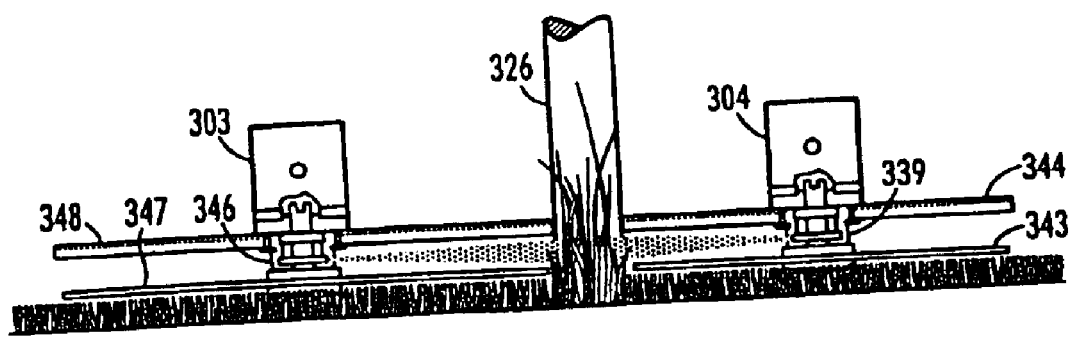
FIG. 25 is a view taken on the line 25—25 in FIG. 24.

The cutter heads 252, 253 are mounted on support arms 301, 302, respectively, and the rotary blades of the cutter heads are driven by hydraulic motors 303, 304. The support arms 301, 302 are non rotatably secured to support shafts 306, 307, respectively, which extend upward through the hollow legs 254, 282 in which they are pivotally supported by appropriate radial and axial bearings, not shown. The upper ends of the shafts 306, 307 have splined connections to aligned output shafts of double acting hydraulic power actuators or modules 311, 312 whose mounting plates 313, 315 are secured by releasable fasteners in the form of cap screws 316 to the upper ends of the legs 254, 282. The power actuators 311, 312 may be model HTR 7.5 units marketed by Parker Hanifin Corporation or other suitable units. As illustrated in FIG. 25, the power actuators 311, 312 each have two hydraulic ram powered gear racks engaging radially opposite sides of their respective externally toothed output shafts 314, 316. The splined ends of the output shafts 314, 316 are releasably connected, respectively, to internally splined ends or couplers on the upper ends of the shafts 306, 307. The internally splined end or coupler 317 of the shaft 306 is shown in FIGS. 16 and 17. The double acting hydraulic actuators 311, 312 may be operated to swing one or both of the cutter heads away from one another to avoid contact with an obstacle or to adjust their spacing suitable for cutting of grass on opposite sides of a row of shrubs, vines or small trees. Pneumatic accumulators 381, 382, 384, 386 bias the mower head support shafts 306, 307 to remain in whatever position they are adjusted by the power modules 311, 312 and permit the shafts to rotate when their cutter heads encounter obstacles such as guard rail posts, sturdy shrubs or small trees. The accumulators 381, 382, 384, 386 are each provided with an air valve by which the air pressure in the accumulator can be a changed thereby changing the biasing force on the associated cutter head support shaft and arm. The power modules 311, 312 are connected to the support shafts 306, 307 in such a manner that they are at the end of their stroke when the disks of the cutter heads are in closely adjacent confronting relation to one another but preferably not touching each other.

Figure 21:
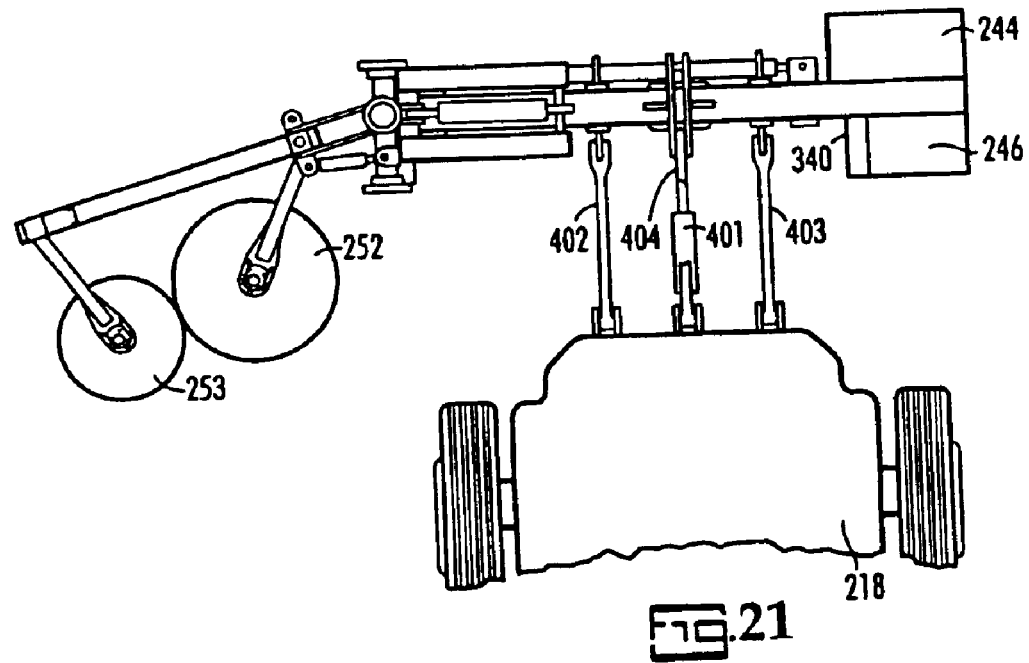
FIG. 21 shows the mower mounted on the front of the tractor for mowing on the left side of the tractor.

As shown in FIG. 19, the second embodiment mower 200 can be connected in a reverse manner to the rear hitch components of the tractor 218, to permit mowing at the left side of the tractor. When reversing the position of the mower, a double acting hydraulic ram 321 interconnected between the coupler 258 and the slide block 256, as shown in FIG. 18, is contracted to pivot the slide block about 34 degrees about the axis 265 to the position shown in FIG. 19 wherein the inverted U shaped frame 251 extends laterally outward in a trailing manner. When reversing the mower, it is necessary to remove the cap screws 316 and lift the power actuators 311, 312 to remove their splined output shafts 314, 316 from their connection with the splined couplers 317 on the upper ends of the cutter head support shafts 306, 307. The cutter heads are then swung to the positions illustrated in FIG. 19 and the power actuators 311, 312 are reinstalled on the upper ends of the legs 254, 282, thereby reconnecting the output shafts 314, 316 to the cutter head support shafts 306, 307. This change in angular position of the support arms 301, 302 of the cutter heads 252, 253 requires repositioning of the position sensing switches 321, 322, shown in FIG. 27, which are part of a spray control system 323 described later herein. In FIGS. 19 and 21 the bracket 276 has been removed for illustration purposes from the top of the leg 254.

Figure 20:
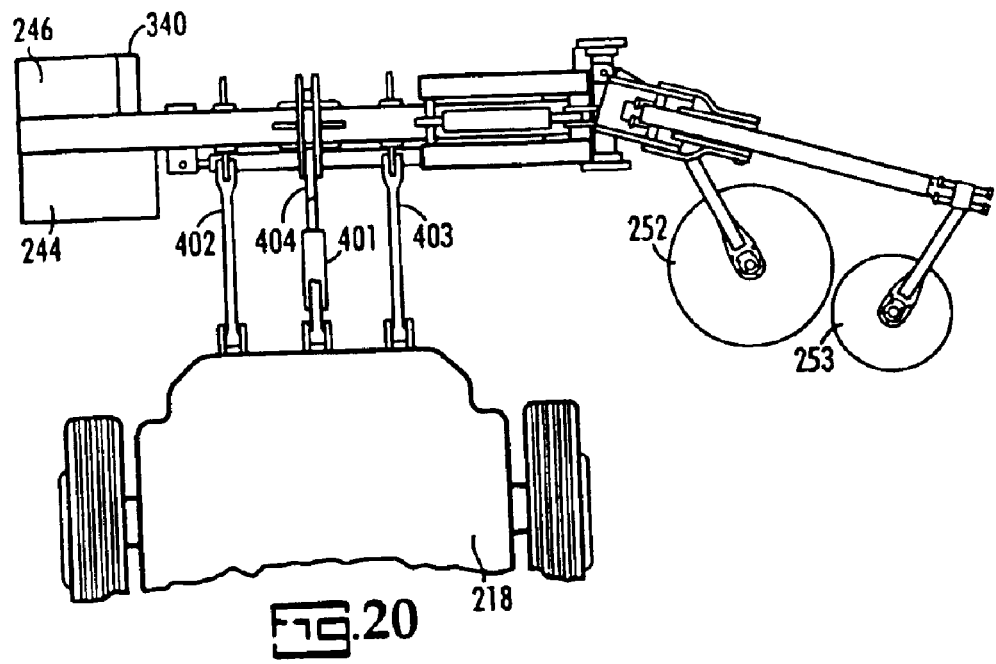
FIG. 20 shows the mower mounted on the front of the tractor for mowing on the right side of the tractor.

If the supporting tractor 218 is equipped with a front power take off shaft 401 and front hitch links 402, 403, 404 the mower can be mounted on the front of the tractor to mow at the left side as shown in FIG. 20 or at the right side as shown in FIG. 21.

Figure 22:
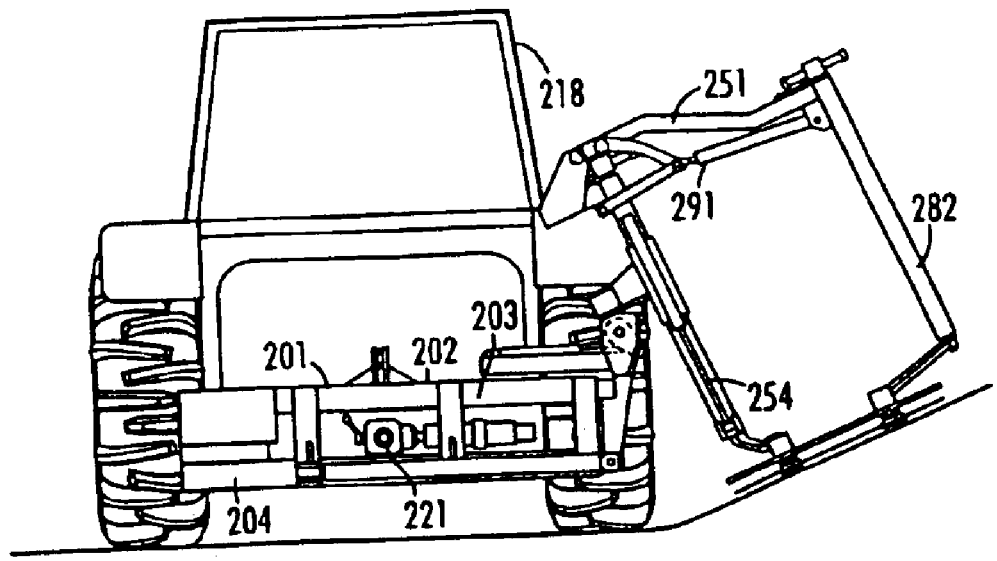
FIG. 22 shows the mower adjusted to mow an area sloping laterally upward from the tractor.
Figure 23:
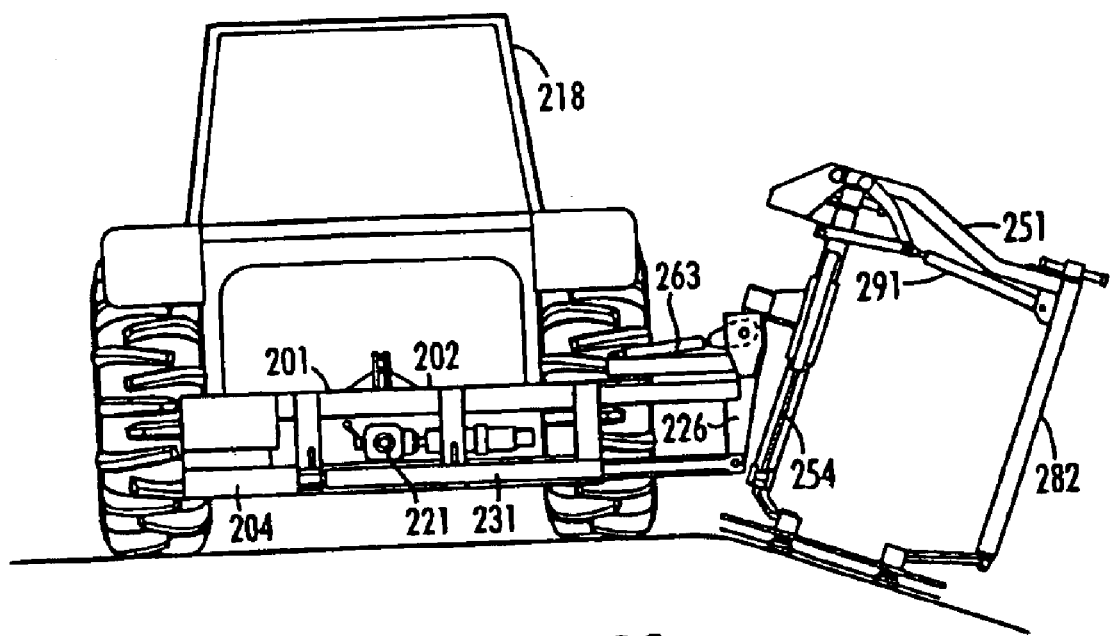
FIG. 23 shows the mower adjusted to mow an area sloping laterally downward from the tractor.

FIG. 22 shows the mower adjusted to mow an area sloping laterally upward from the tractor and FIG. 23 shows the tractor mowing an area sloping laterally downward from the tractor 218. In FIG. 22, the hydraulic ram 231 has been extended to shift the subframe 226 laterally outward to properly space the cutting heads from the tractor.

Referring to FIG. 27, when either of the cutter heads 252, 253 is deflected by a guard rail post 326, or the like, its support arm 301 or 302 and associated shaft 306 or 307 will pivot relative to its supporting leg 254 or 282 thereby closing the associated one of the position sensitive switches 321, 322 in an electric control for a liquid spray applying system. The spray applying system 323 includes the supply reservoir 246, a pump 327 connected in fluid receiving relation to the reservoir 246, an electric motor 328 connected in driving relation to the pump 327 a source of electrical power 329, a manually operable electric switch 331 for controlling operation of the pump motor 328 and the position sensitive switches 321, 322. The spray applying system also includes a main fluid delivery conduit 333 delivering fluid to branch conduits 334, 336 which are connected to the cutter heads 252, 253. The pump 327 and electric motor 328 are contained in a housing 340 mounted on the supply reservoir 246, as shown in FIG. 15.

Figure 26:
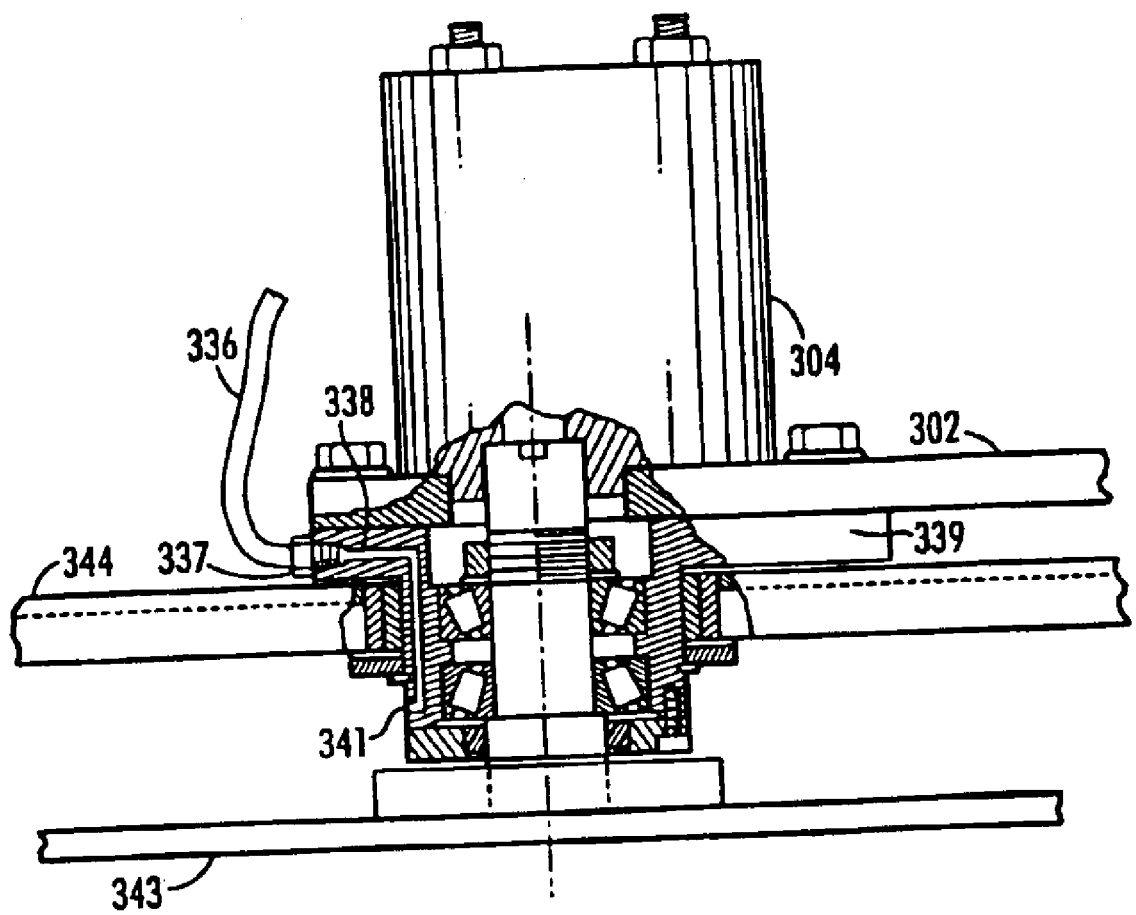
FIG. 26 is a partial side view of a cutting head with parts broken away to show a spray delivery feature.

Referring to FIG. 26, the conduit 336 is connected by a suitable fitting 337 threaded into a internally threaded opening of one end of a fluid passageway 338 in a jackshaft housing 339 of the cutter head 253. The fluid passageway terminates in a spray delivery orifice or nozzle 341 directing spray between the cutter head blade 343 and the round cover disk 344 mounted for free rotation on the jackshaft housing 339. As shown in FIG. 25, the cutter head 252 is constructed similar to cutter head 253 with the branch conduit 334 connected to a passageway in its jackshaft housing 346 terminating in an orifice or nozzle spraying fluid horizontally between its blade 347 and its rotatably mounted cover disk 348.

The spray may be a herbicide for killing plant life adjacent the post 326. FIGS. 21 and 23 show application of the spray from the orifices in the jackshaft housings 339, 346 to the ground area near the post 326. Spray is delivered by operation of the pump 327 when either of the electric switches 321, 322 are closed by rotation of the associated arms 301, 302 of the cutter heads 252, 253. Spray may also be delivered by closing the manually operated switch 331.

Figure 24:
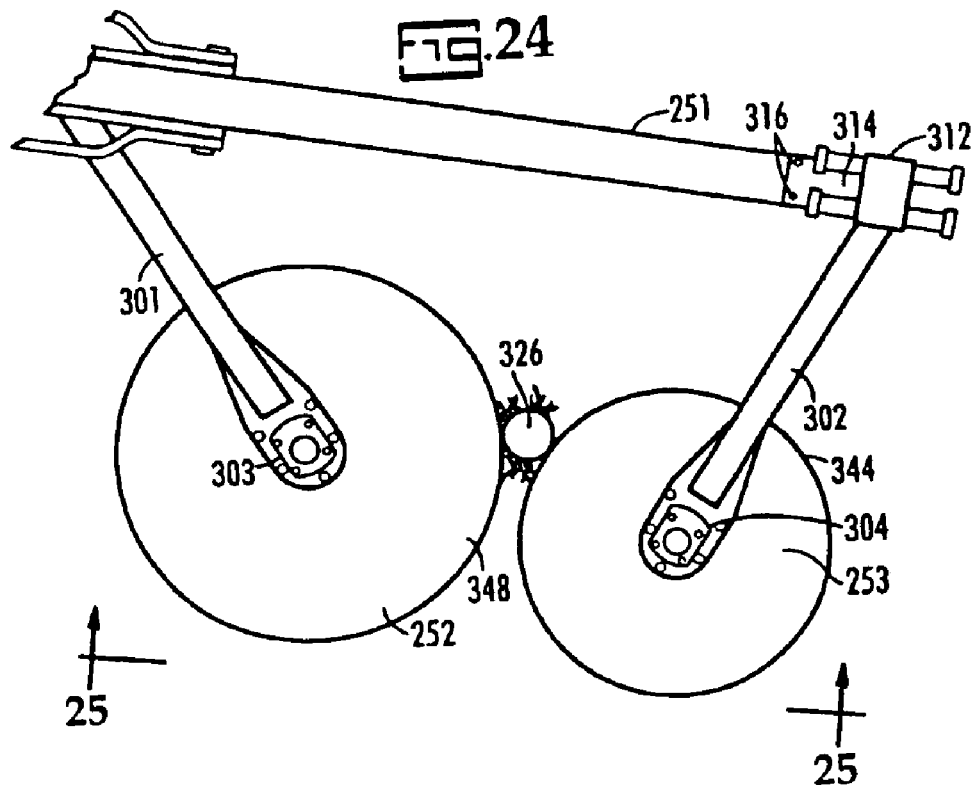
FIG. 24 shows the cutting heads being deflected by a guard rail post.

Referring to FIG. 28, the fluid motors 303, 304 on the cutter heads 252, 253, which are, connected in driving relation to the blades 343, 347, are individually supplied pressure fluid by the pumps 241, 242 through conduits 351, 352, respectively. As beforementioned, the pumps 241, 242 are driven by the power take off shaft of the tractor 218. Flow from the pumps 241, 242 to the cutter head motors 303, 304 is controlled by a pair of solenoid valves 353, 354 which are biased to a return-to-reservoir position, as illustrated in FIG. 24, in which fluid is returned to the fluid reservoir 244 via return line 356. The solenoid valves 353, 354 are controlled by a circuit which includes a main lead 357 connected to a power source 358 and a pair of branch leads 361, 362 interconnecting the solenoid valves 353, 354 with the main lead 357. Manually operated switches 363, 363a control electric power to the solenoid valves 353, 354 which when energized direct pressurized fluid flow to the cutter drive motors 303, 304.

Fluid from the drive motors 303, 304 is returned to the reservoir 244 by return lines 366, 367, 368. Delivery of pressure fluid to the fluid motor 304 driving the outermost cutter head 253 is stopped if the inverted L shaped frame 281 is pivoted upwardly more than 22 degrees causing switch 271 to open. Flow of pressure fluid to both fluid motors 303, 304 is stopped if the inverted U shaped frame 251 is pivoted by hydraulic ram 261 to a transport position, which causes the switch 369 mounted on the main support frame 201 to be opened by engagement by the inverted U shaped frame 251.

Figure 29:
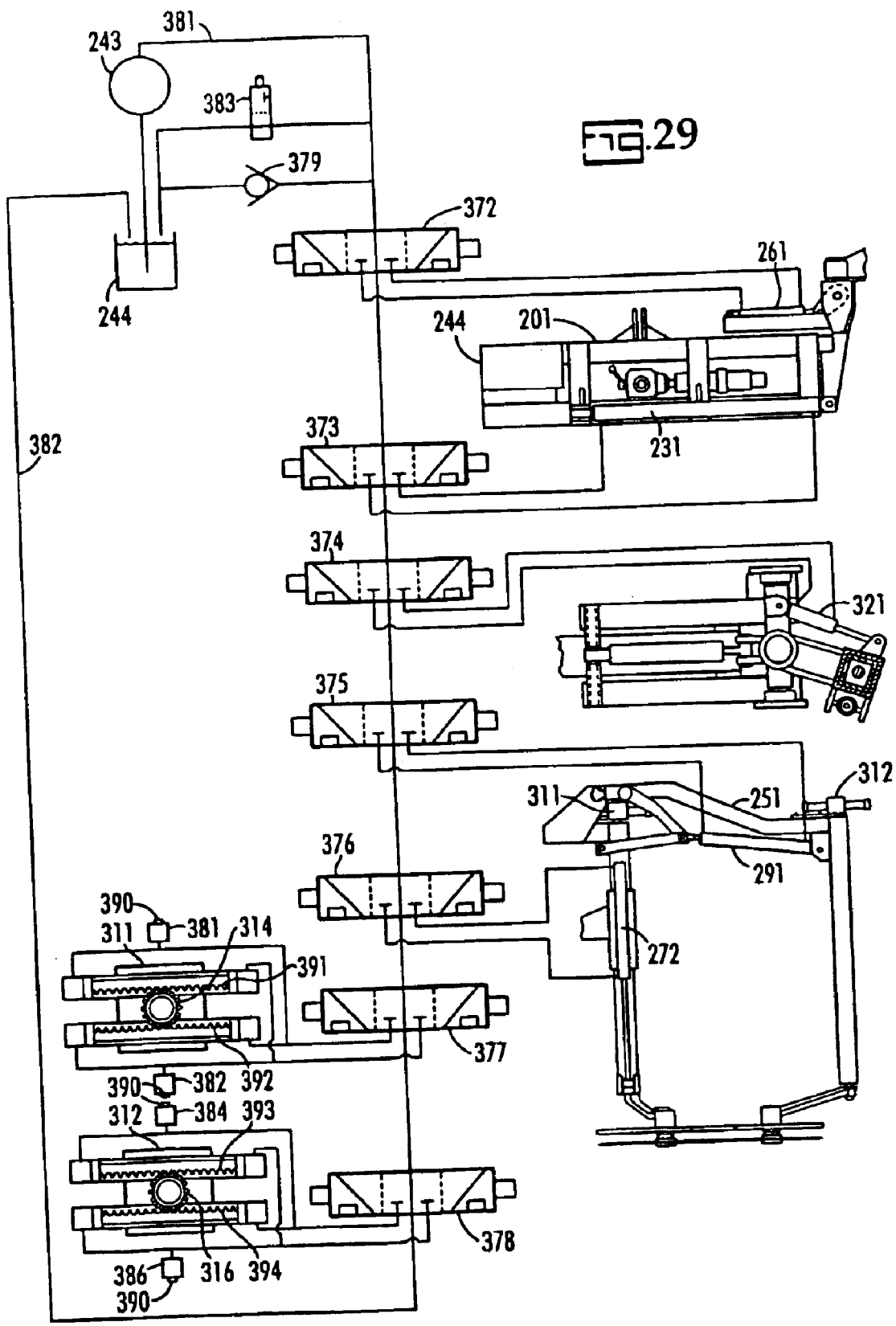
FIG. 29 is a schematic of the hydraulic control system for the various fluid actuators of the second embodiment mower.

FIG. 29 is a schematic showing of a hydraulic control system for the hydraulic rams 261, 231, 321, 291 and power modules 311, 312. The hydraulic pump 243 draws fluid from the reservoir 244 and delivers pressure fluid to open center solenoid valves 372, 373, 374, 375, 376, 377, 378 via conduit 381. In the illustrated non-energized position of the solenoid valves 372 through 378, to which they may be biased by springs or the like, the fluid flow from the pump 243 passes through the valves and returns to the reservoir 244 via return conduit 382. A solenoid operated dumping valve 383 near the pump 243 by-passes fluid to the reservoir 244 when all the valves 372 through 378 are in their illustrated flow through position. This greatly reduces heat build-up in the fluid which would otherwise occur due to flow through the valves and associated delivery and return conduits. A pressure relief valve 379 is provided downstream from the dumping valve 383. An appropriate electric control is provided for operation of the solenoid control valves 372 through 378 and the solenoid dumping valve 383 which may include several joy sticks operating electric switches controlling the valves 372 through 378. The dumping 383 valve is automatically shifted from the illustrated open position to its closed position whenever any one of the control valves 372 through 378 is energized to adjust it to deliver pressure fluid to its associated hydraulic ram or power module.

As illustrated, valve 372 controls operation of the hydraulic ram 261 by which the inverted U shaped frame 251 may be rotated to its transport position above the support frame 201. Valve 373 controls the hydraulic ram 231 which adjusts the lateral slide position of the subframe 202 supporting the U shaped frame 251. Valve 374 controls the ram 321, which in turn controls the trailing angle of the U shaped frame 251. Valve 375 controls the hydraulic ram 291 by which the inverted L shaped frame supporting the outer cutter head may be swung to an overhead position. Valve 376 controls the hydraulic ram 272 by which the inverted U shaped frame 251 may be adjusted relative to the slide block 256. Valves 377 and 378 control operation of the power modules 311, 312, respectively, by which the support shafts 306, 307 may be rotated to change the position of the cutter heads 252, 253. For instance, when mowing on opposite sides of vines or a hedge row, the cutter heads 252, 253 may be spaced apart to leave an uncut area between the cutter heads 252, 253. The valves 372 through 379 and 383 are contained in a manifold 385 on the support frame 210, as shown in FIG. 13.

Pneumatic accumulators 381, 382, 384 and 386 are connected to the fluid delivery lines extending between the valves 377, 378 and the power modules 311, 312 and serve to bias the support shafts 306, 307 to the position adjusted by the pistons operating the gear racks 391, 392, 393, 394 engaging the externally toothed output shafts 314, 316. When either of the freely rotatable disks of the cutter heads 251, 252 encounters a guard rail post or the like, the accumulators associated with the power module connected to the support shaft for that cutter head permit the cutter head support shaft to rotate under the biasing effect of the associated pneumatic accumulators and when the obstacle completes its passage between the disks 334, 348 the cutter head or heads are returned to their preset position, in which the cutter heads are in juxtaposed relation to one another. The air valves 390 permit biasing force provided by the accumulators 381, 382, 384, 386 to be changed by changing the air pressure in the accumulators.

The herein disclosed mower 200 is designed as a self contained unit with valves, pumps and reservoirs mounted on its support frame and with operation controlled by the tractor operator using joystick operated electric controls, not shown, mounted on the tractor. Thus the mower is readily attachable to a tractor having a battery, three point hitch and power take off shaft. The mower is versatile in its operational applications. In addition to its obvious usefulness as a guard rail mower, it is ideally suited for use in mowing on opposite sides of fences, walls, hedges, rows of plants in nurseries or in tree farms.

What is claimed is:

1. A mower comprising:
   a main support frame adapted for supported connection to one end of a self propelled support vehicle having a predetermined direction of forward travel including
   a first subframe having a first pair of vertically spaced parallel guide members extending laterally in relation to said direction of forward travel,
   a second subframe including a second pair of parallel guide members supported by said first pair of guide members for predetermined lateral movement of said second subframe and
   a first linear power actuator interconnected between said first and second subframes operable to adjust the lateral position of said second subframe relative to said first subframe,
   an inverted U shaped frame pivotally connected to and extending laterally from said second subframe including
   a laterally inward upright leg,
   a laterally outward upright leg, and
   a horizontally extending beam having one of its ends rigidly secured to the upper end of said laterally outward leg and having its other end pivotally connected to the upper end of said laterally inward leg, said beam and laterally outward leg being vertically swingable from a mowing position in which said laterally outward leg is upright to an overhead position in which said beam and laterally outward leg are above said laterally inward leg, a rotary cutter head mounted on the lower end of each of said upright legs, a second linear power actuator interconnected between said laterally inward leg and said beam operable to vertically swing said beam to said overhead position, and a third linear power actuator interconnected between said second subframe and said laterally inward leg, said power actuator being operable to pivot said inverted U-shaped frame to an inoperative transport position.

2. The mower as set forth in claim 1 wherein each of said cutter heads includes a rotary blade driven by a motor and further comprising a source of power for said motors, and a position sensitive control automatically interrupting power to said motors when said U-shaped frame is pivoted to said transport position.

3. The mower as set forth in claim 2 and further comprising a position sensitive control automatically interrupting power to said motor driving said rotary blade of said cutter head on said laterally outward leg when said second power actuator pivots said beam more than 20 degrees from a position in which said laterally outward leg is upright.

4. A mowing implement, comprising:

a support structure adapted for supported connection to one of the front and rear ends of a self propelled ground engaging vehicle having a predetermined forward direction of travel, said support structure extending in transverse relation to said forward direction of travel of said vehicle, an inverted U shaped frame pivotally connected to said support structure for swinging movement about an axis extending in said direction of travel between a laterally extending mowing position and a transport position and including a first upright leg, an L shaped component including a second upright leg and a horizontally extending beam having one end secured to the upper end of said second upright leg and its other end pivotally connected to the upper end of said first leg, said horizontally extending beam lying in a first vertical plane extending from said first leg at an acute angle relative to a second vertical plane extending laterally through said first leg, a first power actuator interconnected between said U shaped frame and said support structure operable to move said U shaped frame between said mowing position and said transport position, a first rotary cutter head mounted on the lower end of said first leg including a drive motor and a second rotary cutter head mounted on the lower end of said second leg including a drive motor said second rotary cutter head being disposed in offset trailing relation to said first rotary cutter head whereby the cutting swath of said second rotary cutter head overlaps the cutting swath of said first rotary cutter head sufficiently to prevent leaving uncut vegetation between the cutting heads during a mowing operation.

5. The implement as set forth in claim 4 wherein said acute angle is between 10 and 20 degrees.

6. The implement as set forth in claim 4 wherein said horizontally extending beam is pivotally connected to said first upright leg for swinging movement about a horizontal axis at right angles to said first vertical plane and further comprising a second power actuator between said L shaped component and said first leg operable to swing said L shaped component upwardly to an overhead position above said first leg.

7. The implement as set forth in claim 6 wherein said second power actuator is operable to swing said L shaped component at least 120 degrees.

8. The implement as set forth in claim 6 wherein said second power actuator is operable to swing said L shaped member at least 150 degrees.

9. The implement as set forth in claim 6 having a first arm having one end pivotally mounted on said first leg for pivotal movement about a first vertical axis and its other end connected in supporting relation to said first rotary cutter head, a second arm having one end pivotally mounted on said second leg for pivotal movement about a second vertical axis and its other end connected in supporting relation to said second rotary cutter head, said cutter heads having predetermined cutting positions for a mowing operation, and means biasing said arms, respectively, toward their respective cutting positions.

10. The implement as set forth in claim 9 wherein each of said cutter heads has a rotary cutting blade and a freely rotating disk above and extending radially beyond the associated cutting blade, each of said disks including a cylindrical rim for rollingly engaging rigid obstacles passing between the cutter heads thereby preventing said blades from engaging said obstacles.

11. A mowing implement, comprising:

a support structure adapted for supported connection to one of the front and rear ends of a self propelled ground engaging vehicle having a predetermined forward direction of travel, said support structure extending in transversely in relation to said forward direction of travel of said vehicle, an inverted U shaped frame pivotally connected to said support structure for swinging movement about a horizontal axis between a laterally extending mowing position and a transport position and including a first upright leg, an L shaped component including a second upright leg and a horizontally extending beam having one end secured to the upper end of said second upright leg and its other end connected to the upper end of said first leg, said horizontally extending beam lying in a first vertical plane extending from said first leg at an acute angle relative to a second vertical plane extending laterally through said first leg, a first vertical pivot shaft pivotally mounted on and extending between the upper and lower ends of said first leg a first arm secured to and extending radially from the lower end of said first shaft, a second vertical shaft pivotally mounted on and extending between the upper and lower ends of said second leg a second arm secured to and extending radially from the lower end of said second shaft, a first rotary cutter head mounted on first arm including a drive motor a second rotary cutter head mounted on said second arm including a drive motor, said second rotary cutter head being disposed in offset trailing relation to said first rotary cutter head whereby the cutting swath of said second rotary cutter head overlaps the cutting swath of said first rotary cutter head sufficiently to prevent leaving uncut vegetation between the cutting heads during a mowing operation, a first power actuator mounted on to said U shaped frame and connected to said first vertical shaft, said first power actuator being operable to pivot said first vertical shaft in a direction moving said first cutter head laterally inward and a second power actuator mounted on said U shaped frame and connected to said second vertical shaft, said second power actuator being operable to pivot said second vertical shaft in a direction moving said second cutter head laterally outward.

12. The implement as set forth in claim 11 wherein said first and second power actuators are single acting linear hydraulic actuators having a cylinder and a piston moveable between contracted and extended positions and further comprising springs biasing said pistons toward said contracted positions.

13. The implement of claim 11 having a pair of biasing means associated with said shafts urging said cutter heads toward one another.

14. The implement of claim 13 wherein said biasing means are springs.

15. The implement of claim 14 having means for adjusting the force of said biasing means.

16. The implement of claim 13 wherein said power actuators are double acting hydraulic actuators operable to pivot said shafts in either direction and wherein said biasing means are pneumatic accumulators connected to said actuators.

17. The implement of claim 16 having means for adjusting the pressure in said accumulators.

18. The implement as set forth in claim 11 wherein said support structure includes a first subframe adapted for connection to said vehicle and including a first pair of vertically spaced parallel guide members extending horizontally in a direction transverse to said forward direction of travel, a second subframe including a second pair of parallel guide members supported by said first pair of guide members and a third linear power actuator interconnected between said first and second subframes operable to adjust the lateral position of said second subframe relative to said first subframe, said inverted U shaped frame being pivotally connected to said second subframe.

19. The implement as set forth in claim 18 and further comprising a connector connecting said U shaped frame to said second subframe including lever arm pivotally connected to said second subframe on said horizontal axis and a slide block slidingly supporting said first leg, a fourth linear power actuator interconnected between said sliding block and said first leg operable to adjust the vertical position of said U shaped frame and a fifth linear power actuator having one of its ends pivotally connected to said second subframe and the other of its ends pivotally connected to said lever arm of said connector on an axis spaced from said pivot connection between said lever arm and said second subframe.

20. A mower comprising:

a support structure adapted for supported connection to one of the front and rear ends of a self propelled ground engaging vehicle having a predetermined forward direction of travel, said support structure extending in transverse relation to said forward direction of travel of said vehicle, an inverted U shaped frame pivotally connected to said support structure for swinging movement about an axis extending in said direction of travel between a mowing position and a transport position and including a first upright leg and an L shaped component including a second upright leg and a horizontally extending beam having one end secured to the upper end of said second upright leg and its other end pivotally connected to the upper end of said first leg for swinging movement about a horizontal axis, said horizontally extending beam lying in a vertical plane extending from said first leg at an acute angle relative to a vertical plane through said first leg transverse to said forward direction of travel, a first rotary cutter head mounted on the lower end of said first leg including a drive motor and a second rotary cutter head mounted on the lower end of said second leg including a drive motor, said second rotary cutter head being disposed in offset trailing relation to said first rotary cutter head whereby the cutting swath of said second rotary cutter head overlaps the cutting swath of said first rotary cutter head sufficiently to prevent leaving uncut vegetation between the cutting heads during a mowing operation.

21. A mower comprising:

a main support frame adapted for supported connection to one end of a self propelled support vehicle having a predetermined direction of forward travel including a first subframe having a first pair of vertically spaced parallel guide members extending laterally in relation to said direction of forward travel, a second subframe including a second pair of parallel guide members supported by said first pair of guide members for predetermined lateral movement of said second subframe and a first linear power actuator interconnected between said first and second subframes operable to adjust the lateral position of said second subframe relative to said first subframe, an inverted U shaped frame at one end of said second subframe including a first upright leg, an L shaped component including a second upright leg and a horizontally extending beam having one end rigidly secured to the upper end of said second upright leg and its other end pivotally connected to the upper end of said first leg for swinging movement about a first horizontal axis, said horizontal beam lying in a vertical plane extending from said first leg at an acute angle relative to a laterally extending vertical plane through said first leg, and a second linear power actuator interconnected between said first leg and said L shaped component, a connector connecting said first leg to said second subframe including a sliding block slidingly supporting said first leg for longitudinal movement and a lever arm pivotally connected to said second subframe on a second horizontal axis extending in said direction of forward travel, a third linear power actuator having one end connected to said second subframe and its other end pivotally connected to said lever arm of said connector at a point spaced from said second horizontal axis, said second linear power actuator being operable to pivot said U shaped frame from its mowing position in which said legs are upright to a transport position in which said legs are horizontally disposed above said first subframe, a first vertical support shaft pivotally mounted on and extending between the upper and lower ends of said first leg, a first arm secured to and extending radially from the lower end of said first shaft, a second vertical support shaft pivotally mounted on and extending between the upper and lower ends of said second leg, a second arm secured to and extending radially from the lower end of said second shaft, a first rotary cutter head mounted on said first arm including a drive motor, a second rotary cutter head mounted on said second arm including a drive motor, said second rotary cutter head being disposed in offset trailing relation to said first rotary cutter head whereby the cutting swath of said second rotary cutter head overlaps the cutting swath of said first rotary cutter head sufficiently to prevent leaving uncut vegetation between the cutting heads during a mowing operation, a fourth linear power actuator mounted on to said U shaped frame and connected to said first vertical shaft, said fourth power actuator being operable to pivot said first vertical shaft in a direction moving said first cutter head laterally inward, a fifth linear power actuator mounted on said U shaped frame and connected to said second vertical shaft, said fifth power actuator being operable to pivot said second vertical shaft in a direction moving said second cutter head laterally outward and a control system for said mower including
a source of power for said drive motors and said linear actuators,
a position sensitive control automatically interrupting power to said drive motors when said U shaped frame is pivoted to said transport position,
a position sensitive control automatically interrupting power to said drive motor of said second rotary cutter head when said L shaped member is pivoted upwardly more than 25 degrees,
manually operable control elements for individually controlling extension and contraction of said linear power actuators and for controlling power to said drive motors.

22. A mower comprising:
a laterally extending main support frame including hitch connections adapted for connection to a self propelled support vehicle transverse to the direction of travel of said vehicle,
an inverted U shaped frame connected to said main frame and extending laterally from said main support frame at one lateral side of said support vehicle, said inverted U shaped frame including a laterally inward upright leg and a laterally outward upright leg,
a first arm having one end pivotally mounted on the lower end of said laterally inward upright leg,
a second arm having one end pivotally mounted on the lower end of said outward upright leg,
a pair of cutter heads mounted respectively on the other ends of said first and second arms, each of said cutter heads having a rotating cutting blade and a freely rotating disk coaxially mounted above and extending radially beyond the associated cutting blade, each of said disks including a cylindrical rim for rolling engagement with rigid obstacles passing between the cutter heads during a mowing operation thereby preventing said blades from engaging said obstacles, a pair of double acting hydraulic actuators interconnected, respectively, between said U shaped frame and said arms operable to move said cutting heads between juxtaposed and spaced apart positions, and apparatus for delivering a liquid spray to the ground area between said disks including
an orifice on each of said cutter heads for directing liquid to said ground area,
a source of pressurized liquid and
a control system for delivering pressurized liquid to said orifices.

23. The mower of claim 22 having a manual control for selectively causing delivery of said pressurized liquid to said orifices.

24. The mower of claim 22 wherein said orifice is positioned between said disk and said cutting blade of the associated cutter head.

25. The mower of claim 22 wherein said pressurized liquid is a herbicide.

26. The mower of claim 22 wherein said control system automatically delivers pressurized liquid to said orifices when one of said disks engage an obstacle passing between said cutter heads during a mowing operation of said mower.

27. The mower of claim 22 wherein each of said blades is rotatably supported by a jackshaft housing and wherein said orifices are in said jackshaft housings, respectively.

28. A mower comprising:
a laterally extending main support frame including hitch connections adapted for connection to a self propelled support vehicle transverse to the direction of travel of said vehicle,
an inverted U shaped frame connected to said main frame and extending laterally from said main support frame at one lateral side of said support vehicle, said inverted U shaped frame including a laterally inward upright leg and a laterally outward upright leg,
a first arm having one end pivotally mounted on the lower end of said laterally inward upright leg,
a second arm having one end pivotally mounted on the lower end of said outward upright leg,
a pair of cutter heads mounted respectively on the other ends of said first and second arms, each of said cutter heads having a rotating cutting blade and a freely rotating dish coaxially mounted above and extending radially beyond the associated cutting blade, each of said disks including a cylindrical rim adapted for rolling engagement with rigid obstacles passing between the cutter heads during a mowing operation thereby preventing said blades from engaging said obstacles,
means biasing said arms so as to position said cutting heads in juxtaposed relation to one another, and
apparatus for delivering a liquid spray to the area being cut including
an orifice on each of said cutter heads for directing liquid spray to said area being cut,
a source of pressurized liquid and
a control system for selectively delivering pressurized liquid to said orifices.

29. The mower of claim 28 wherein each of said blades is rotatably supported by a jackshaft housing and wherein said orifices are in said jackshaft housings, respectively, between said disk and said cutting blade of the associated cutter head.

30. A mower comprising:
a laterally extending main support frame having
a front side and a rear side,
upper and lower hitch connections on said front side adapted for connection to corresponding hitch components of a self propelled support vehicle, and
upper and lower hitch connections on said rear side adapted for connection to said corresponding hitch components of said support vehicle,
an inverted U shaped frame pivotally connected to said main frame on a vertical axis and extending laterally from said main frame, said inverted U shaped frame including a laterally inward hollow upright leg and a laterally outward hollow upright leg,
a pair of vertical support shafts extending through said hollow upright legs, respectively,
a first arm having one end secured to the lower end of said support shaft in said laterally inward upright leg,
a second arm having one end secured to the lower end of said support shaft in said laterally outward upright leg,
a pair of cutter heads mounted respectively, on the other ends of said first and second arms, each of said cutter heads including a rotary cutting blade and a freely rotatable disc coaxial with and above said cutting blade,
a first double acting linear hydraulic ram interconnected between said U shaped frame and said main frame operable to pivot said U shaped frame about said vertical axis at least 10 degrees in both directions from a plane transverse to straight ahead direction of travel of said vehicle, and
biasing apparatus releasably mounted on the top of each of said upright legs, each of said biasing apparatus having a releasable connection with the upper end of said vertical support shaft in the associated leg, said biasing apparatus biasing said cutter heads to predetermined contiguous cutting positions, each of said biasing apparatus permitting pivoting of the support shaft to which it is releasably connected when said disk of the associated cutter head encounters an obstacle and said biasing apparatus returning the associated cutter head to its predetermined cutting position when said associated cutter head is clear of said obstacle.

31. The mower of claim 30 wherein each of said biasing apparatus includes a pneumatic accumulator.

32. The mower of claim 30 wherein said arms extend at predetermined angles from one side of a plane defined by said legs when said hitch connections on said front side of said main support frame are attached to said support vehicle, said releasable connections between said biasing apparatus and said shafts permitting said arms to be repositioned to extend at comparable predetermined angles from said other side of said plane when said hitch connections on said rear side of said support frame are attached to said corresponding hitch connections of said self propelled vehicle.

33. The mower of claim 32 wherein said main support frame includes a first subframe which includes said hitch connections and a first pair of vertically spaced parallel guide members extending laterally in relation to the direction of travel of said support vehicle, and a second subframe including a second pair of parallel guide members supported by said first pair of guide members for predetermined lateral movement of said second subframe and a second double acting linear hydraulic ram interconnected between said first and second subframes operable to adjust the lateral position of said second subframe relative to said first subframe.

34. The mower of claim 33 having a connector including
a first part connected to said inner leg and
a second part pivotally connected to said second subframe on a fore and aft extending horizontal axis and
a third double acting linear hydraulic ram interconnected between said second subframe and said second part operable to pivot said U shaped frame between a mower cutting position in which said legs are upright to a transport position in which said legs are positioned horizontally above said main frame.

35. The mower of claim 34 wherein said first part includes a slid block supporting said inner leg for longitudinal movement, and further comprising a double acting linear actuator between said slid block and said inward leg.

36. A mower comprising:
a laterally extending main support frame having
a front side and a rear side,
hitch connections on said front side adapted for connection to corresponding hitch connections of a supporting vehicle and
hitch connections on said rear side adapted for connection to said corresponding hitch connections of a support vehicle,
an inverted U-shaped frame connected to said main support frame and having a laterally inward upright leg and a laterally outward upright leg,
a first cutter head support arm,
a first cutter head on one end of said first support arm,
a second cutter head support arm,
a second cutter head on one end of said second support arm,
a repositionable connection between the other end of said first support arm and said first leg,
a repositionable connection between the other end of said second support arm and said second leg,
said repositionable connections having
a first connection position in which said arms are positioned to place said cutter heads in staggered relation to one another at one side of said U shaped frame to cut overlapping swathes at one lateral side of said supporting vehicle when said vehicle is connected to said hitch connections on said front side of said main frame, and
a second connection position in which said arms are positioned to place said cutter heads in staggered relation to one another at the other side of said U-shaped frame to cut overlapping swathes at the other lateral side of said supporting vehicle when said vehicle is connected to said hitch connections on said rear side of said main frame.

37. A rotary mower comprising:
a support,
a cutting blade rotatably mounted on said support for rotation about a vertical axis and
an annular cover rotatably mounted on said support above said cutting blade, said cover having a radially outward facing cylindrical surface at its periphery.

* * * * *